United States Patent
Alacoque

(10) Patent No.: US 7,298,112 B2
(45) Date of Patent: Nov. 20, 2007

(54) DEADBEAT CONTROL METHOD AND CONTROL UNIT FOR AN ASYNCHRONOUS ROTARY ELECTRICAL MACHINE AND A STORAGE MEDIUM THEREFOR

(75) Inventor: Jean Alacoque, Communay (FR)

(73) Assignee: Alstom Transport SA, Levallois-Perret (FR)

( * ) Notice: Subject to any disclaimer, the term of this patent is extended or adjusted under 35 U.S.C. 154(b) by 0 days.

(21) Appl. No.: 11/435,016

(22) Filed: May 16, 2006

(65) Prior Publication Data
US 2006/0273754 A1     Dec. 7, 2006

(30) Foreign Application Priority Data
May 23, 2005   (FR) ................................. 05 05137

(51) Int. Cl.
   *H02P 21/12*   (2006.01)
(52) U.S. Cl. ..................... 318/811; 318/432
(58) Field of Classification Search ........ 318/430–434, 318/801, 807–812, 560–561
See application file for complete search history.

(56) References Cited

U.S. PATENT DOCUMENTS

| | | | | |
|---|---|---|---|---|
| 4,894,599 | A | * | 1/1990 | Ottesen et al. ............... 318/636 |
| 4,926,105 | A | * | 5/1990 | Mischenko et al. ......... 318/800 |
| 5,334,923 | A | * | 8/1994 | Lorenz et al. ............... 318/805 |
| 5,610,485 | A | * | 3/1997 | Depenbrock et al. ....... 318/432 |
| 5,973,474 | A | * | 10/1999 | Yamamoto ................... 318/801 |
| 6,313,603 | B1 | | 11/2001 | Poullain et al. ............. 318/809 |
| 6,377,018 | B2 | * | 4/2002 | Tajima et al. ............... 318/727 |

FOREIGN PATENT DOCUMENTS

EP   ER 1 045 514   10/2000

OTHER PUBLICATIONS

Sheng-Ming Yang, Chen-Haur Lee, "A current control technique for voltage-fed induction motor drives", 1999 IEEE; pp. 1380 to 1385.
Barbara H. Kenny, Robert D. Lorenz, "Stator- and Rotor-Flux-Based Deadbeat Direct Torque Control of Induction Machines", IEEE Transactions on Industry Applications, vol. 39, No. 4, Jul./Aug. 2003, pp. 1093 to 1102.

* cited by examiner

*Primary Examiner*—Bentsu Ro
(74) *Attorney, Agent, or Firm*—Davidson, Davidson & Kappel, LLC

(57)   ABSTRACT

This deadbeat control method of controlling an asynchronous rotary electrical machine consists of:
  a) a step of establishing a set point current that is adapted to achieve at the end of the interval T both the mechanical force set point and a set point magnetic flux and is established on the basis of a relationship between the set point current, the set point magnetic flux and initial current and magnetic flux values at the beginning of the interval T; and
  b) a step of calculating an average control vector to be applied continuously during the interval T to obtain at the end of the interval T a current equal to the set point current established during the step a).

8 Claims, 4 Drawing Sheets

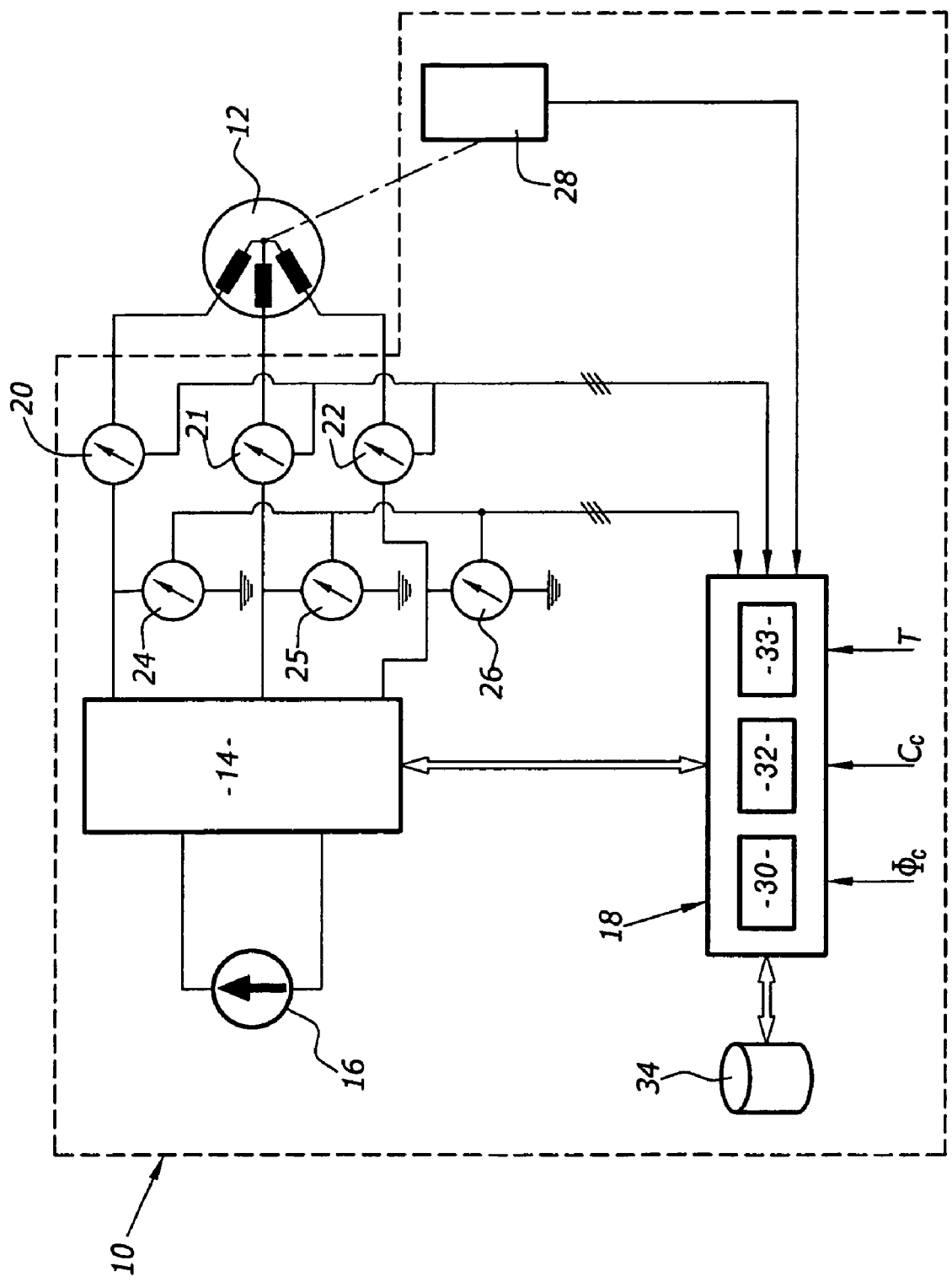

DEADBEAT CONTROL METHOD AND CONTROL UNIT FOR AN ASYNCHRONOUS ROTARY ELECTRICAL MACHINE AND A STORAGE MEDIUM THEREFOR

The present invention relates to a deadbeat control method and a deadbeat control unit for an asynchronous rotary electrical machine and to a storage medium for use in that deadbeat control method.

In the remainder of the description, the term "motor" refers to an asynchronous rotary electrical machine. By way of a preamble to the description given below, it should be pointed out here that an asynchronous rotary electrical machine is an isotropic motor, i.e. a motor in which the direct inductances are equal to the quadrature inductances. In the case of isotropic machines, the dimensions m and n as defined below are made smaller by writing matrices and vectors in the complex plane.

BACKGROUND OF THE INVENTION

Deadbeat control methods can use the state equation formalism known in the art that is based on the principle that the state of a motor is entirely described by known values taken by parameters representing its degrees of freedom. The state of a motor can be characterized by an n-dimensional state vector $\vec{X}$ where n is equal to the number of degrees of freedom. Changes in the machine resulting from a control input represented by an m-dimensional control vector $\vec{V}$ adapted to control the machine are then described by the following system of linear state equations, which will be familiar to the person skilled in the art of automatic control:

$$\dot{\vec{X}} = A \cdot \vec{X} + B \cdot \vec{V} \quad (1)$$

where:

$\dot{\vec{X}}$ is the derivative with respect to time of the state vector $\vec{X}$;

$\vec{V}$ is the instantaneous control vector;

A is an n.n-dimensional matrix of free behavior of the machine in the absence of any control input; and B is an n.m-dimensional control matrix.

In the case of isotropic motors, the dimensions n and m are made smaller by writing matrices and vectors in the complex plane.

The two matrices A and B represent a linear model of the motor and are obtained from electrical differential equations of the motor for a given dynamic state. A model that is not linear must be linearized about an operating point and in this case it is therefore necessary to have a plurality of models available.

To determine the state of the motor at the end of an interval T of continuous application of an average control vector $\vec{V}$, it is necessary to integrate equation (1) between two times $t_n$ and $t_{n+1}$ spaced in time by the interval T. The result may be put into the form of a discrete system of state equations known in the art:

$$\vec{X}(t_{n+1}) = F(T) \cdot \vec{X}(t_n) + G(T) \cdot \vec{V}(t_{n \to n+1}) \quad (2)$$

where:

F(T) is an n.n-dimensional transition matrix of the motor defined by $F = e^{A \cdot T}$;

G(T) is an n.m-dimensional control matrix defined by $G = A^{-1} \cdot (e^{A \cdot T} - I_{nn}) \cdot B$ where $I_{nn}$ is the n.n-dimensional unit matrix;

$\vec{X}(t_{n+1})$ and $\vec{X}(t_n)$ are the state vectors at the times $t_{n+1}$ and $t_n$, respectively; and $\vec{V}(t_{n \to n+1})$ is the average control vector applied during the interval T, i.e. from the time $t_n$ to the time $t_{n+1}$.

The average control vector $\vec{V}$ is either an instantaneous vector applied continuously during the interval T or the average of a time succession of instantaneous control vectors $\vec{V}$ applied directly to the motor during the interval T. In the case of a time succession of instantaneous vectors, each instantaneous vector is applied for a time period that is very short compared to the time constants of the motor, with the result that the application of this succession of instantaneous vectors produces the same effects as the continuous application of a single instantaneous vector of selected phase and amplitude during the same time interval T.

A succession of instantaneous vectors is often used because most motor drives can produce only a limited number of amplitudes and phases of the instantaneous control vectors. For example, a three-phase inverter can produce only six different non-zero instantaneous control vectors. This being so, to be able to obtain a control vector of any amplitude and phase from a three-phase inverter, it is standard practice to apply directly to the motor a time succession of instantaneous control vectors whose average value $\vec{V}$ between the times $t_n$ and $t_{n+1}$ is equal to an average control vector whose phase and amplitude are selected at will. For example, a pulse width modulation method produces an average control vector whose phase and amplitude may be chosen at will from a power supply device able to produce only a limited number of phases and amplitudes of the instantaneous control vectors.

In the remainder of the description, unless otherwise indicated, the term "control vector" refers to an average control vector.

A control vector is typically a voltage vector applying a specific voltage to all phases of the motor simultaneously.

If a model (A, B) of the motor and an initial state $\vec{X}_0 = \vec{X}(t_n)$, which may be measured, for example, or estimated on the basis of an observer such as a Kalman filter, are known, it becomes possible to predict the new state $\vec{X}_p = \vec{X}(t_n + T)$ after continuous application of the control vector $\vec{V}$ during the interval T.

In contrast, it is possible to calculate the control vector $\vec{V}$ to be applied for the predicted state to coincide with a set point state, which amounts to replacing $\vec{X}_p$ with a set point state $\vec{X}_c$. The discrete system of state equations then becomes:

$$\vec{X}_c = F(T) \cdot \vec{X}_0 + G(T) \cdot \vec{V} \quad (3)$$

However, the matrix G(T) is not square and therefore cannot be inverted, with the result that we do not know how to calculate analytically the control vector $\vec{V}$ that is the solution of the system of equations (3).

This being the case, the system of equations is conventionally inverted and the control vector calculated by means of approximate methods. In the case of rotary motors or rotary electrical machines in which the magnetic flux varies slowly, the approximation comprises assuming the magnetic flux of the motor is established under steady state conditions.

By means of this kind of approximation, it is then possible to calculate a control vector enabling a set point torque to be achieved at the end of the interval T. European Patent Application EP-A-1 045 514 discloses one example of the above kind of deadbeat control method.

However, when this kind of deadbeat control method is used in practice, the motor becomes progressively demagnetized. These control methods therefore have the drawback that it is necessary to add a loop to slave the magnetic flux of the motor to a set point flux to prevent demagnetization of the motor by the deadbeat control method.

OBJECTS AND SUMMARY OF THE INVENTION

The invention aims to solve this problem by proposing a deadbeat control method in which it is not necessary to use an additional loop to slave the magnetic flux of the motor.

Thus the invention comprises a deadbeat control method of controlling a motor whose magnetic flux depends on its energization current, the method comprising:

a) a step of establishing a set point current that is adapted to achieve at the end of the interval T both the mechanical force set point and a set point magnetic flux and is established on the basis of a relationship between the set point current, the set point magnetic flux and initial current and magnetic flux values at the beginning of the interval T; and b) a step of calculating the average control vector to be applied continuously during the interval T to obtain at the end of the interval T a current equal to the set point current established during the step a).

In contrast to the prior art deadbeat control method, the above method first establishes a current set point for achieving both the mechanical force set point and a set point magnetic flux before calculating the control vector for achieving the set point current. The magnetization of the motor is therefore preserved without it being necessary to add a magnetic flux control loop for this purpose, since the magnetic flux is kept equal to the set point magnetic flux.

Embodiments of this control method may have one or more of the following features:

the set point current is a solution of the following relationship in the complex plane:

$$(a_2 p_{11} - a_1 p_{21}) \cdot \vec{I}_c + (a_2 p_{12} - a_1 p_{22}) \cdot \vec{\Phi}_c = (a_2 e_1 p_{11} - a_1 e_2 p_{21}) \cdot \vec{I}_0 + (a_2 e_1 p_{12} - a_1 e_2 p_{22}) \cdot \vec{\Phi}_0$$

in which:

$p_{ij}$ are the coefficients of the inverse of a matrix P of eigenvalues defined by the following relationship $A = P \cdot D \cdot P^{-1}$, where D is the diagonal matrix consisting of the eigenvalues $\mu_i$ of the matrix A, $P^{-1}$ is the inverse of the matrix P, and the matrix A is the matrix of free behavior of the motor in a linear system of state equations modeling the operation of the motor;

the coefficients $a_i$ are the coefficients of a matrix C defined by the following relationship $C = D^{-1} \cdot (e^{D \cdot T} - I) \cdot (P^{-1} \cdot B)$, in which the matrix I is the unit matrix and the matrix B is the control matrix of the motor in the linear system of state equations;

the vectors $\vec{\Phi}_0$ and $\vec{I}_0$ respectively represent the initial state of the current and of the magnetic flux of the motor at the beginning of the interval T;

the vectors $\vec{I}_c$ and $\vec{\Phi}_c$ are respectively the set point current vector and the set point magnetic flux vector; and the coefficients $e_i$ are defined by the following relationship $e_i = e^{\mu_i T}$;

the control vector is the exact solution of the following discrete system of state equations of the motor:

$$\vec{X}_c = F(T) \cdot \vec{X}_0 + G(T) \cdot \vec{V}$$

in which:

the vector $\vec{X}_0$ is a state vector defining the initial states of the current and the magnetic flux of the motor at the beginning of the interval T;

the vector $\vec{X}_c$ is a set point state vector defining the set point current and the set point magnetic flux of the motor;

the vector $\vec{V}$ is the control vector of the motor;

the matrix F(T) is a transition matrix of the motor defined by the relation $F = e^{A \cdot T}$, where A is the matrix of free behavior of the motor in a linear system of state equations modeling the operation of the motor; and the matrix G(T) is a control matrix of the motor whose value is a function of the value of the interval T;

the control vector is the result of the following relationship:

$$\vec{v} = e^{i-\theta_0} \cdot \frac{\begin{array}{l} e^{\mu_1 \cdot T}[p_{11}(I_{0d_0} + i \cdot I_{0q_0}) + p_{12} \cdot \Phi_{0d_0}] \cdot \\ [p_{21} \cdot (I_{cd} + i \cdot I_{cq}) + p_{22} \cdot \Phi_{cd}] - \\ e^{\mu_2 \cdot T} \cdot [p_{21} \cdot (I_{0d_0} + i \cdot I_{0q_0}) + p_{22} \cdot \Phi_{0d_0}] \cdot \\ [p_{11} \cdot (I_{cd} + i \cdot I_{cq}) + p_{12} \cdot \Phi_{cd}] \end{array}}{\begin{array}{l} a_2 \cdot [p_{11} \cdot (I_{cd} + i \cdot I_{cq}) + p_{12} \cdot \Phi_{cd}] - \\ a_1 [p_{21} \cdot (I_{cd} + i \cdot I_{cq}) + p_{22} \cdot \Phi_{cd}] \end{array}}$$

in which:

$\theta_0$ the angular position of an initial system of axes whose abscissa axis is aligned with an initial magnetic flux vector of the motor at the beginning of the interval T;

the coefficients $p_{ij}$ are the coefficients of the inverse of a matrix P of eigenvectors defined by the relation $A = P \cdot D \cdot P^{-1}$, where D is the diagonal matrix consisting of the eigenvalues $\mu_i$ of the matrix A, $P^{-1}$ is the inverse of the matrix P, and the matrix A is the matrix of free behavior of the motor in a linear system of state equations modeling the operation of the motor;

$I_{0d_0}, I_{0q_0}$ are the coordinates of the initial current vector at the beginning of the interval T in an initial system of axes whose abscissa axis is aligned with the direction of the initial magnetic flux vector;

$\Phi_{0d_0}$ is the abscissa of the initial magnetic flux vector in the initial system of axes;

$I_{cd}, I_{cq}$ are the coordinates of the set point current vector at the end of the interval T in a set point system of axes whose abscissa axis is aligned with the direction of the set point magnetic flux vector; and $\Phi_{cd}$ is the abscissa of the set point magnetic flux vector in the set point system of axes;

the state vector of the linear system of state equations modeling the operation of the motor is formed of a stator current vector and a rotor magnetic flux vector.

The implementations of this method also have the following advantages:
- the fact that the set point current is a solution of the above equation guarantees that it will achieve at the end of the interval T both the mechanical force set point and the required set point flux;
- the fact that the control vector is also the exact solution of the above system of state equations also guarantees that the control method will achieve at the end of the interval T the set point current that has been fixed;
- the stator current vector is easily measured, which facilitates implementation of the control method; and
- the rotor magnetic flux vector varies slowly, which facilitates estimating it by means of an observer.

The invention also provides a deadbeat control unit for controlling a rotary motor controlled on the basis of its energization current; said unit includes:
- a module for establishing a set point current that is adapted to achieve at the end of the interval T both the mechanical force set point and a set point magnetic flux and is established on the basis of a relationship between the set point current, the set point magnetic flux and initial current and magnetic flux values at the beginning of the interval T; and
- a module for calculating a control vector to be applied continuously during the interval T to obtain at the end of the interval T a current equal to the set point current established by the module for establishing the set point current.

The invention further provides an information storage medium that contains instructions for executing the above control method when said instructions are executed by an electronic computer.

BRIEF DESCRIPTION OF THE DRAWINGS

The invention can be more clearly understood on reading the following description, which is given by way of example only and with reference to the drawings, in which:

FIG. 3 is a diagram of the architecture of a three-phase asynchronous electrical motor control system.

MORE DETAILED DESCRIPTION

Figure 4:
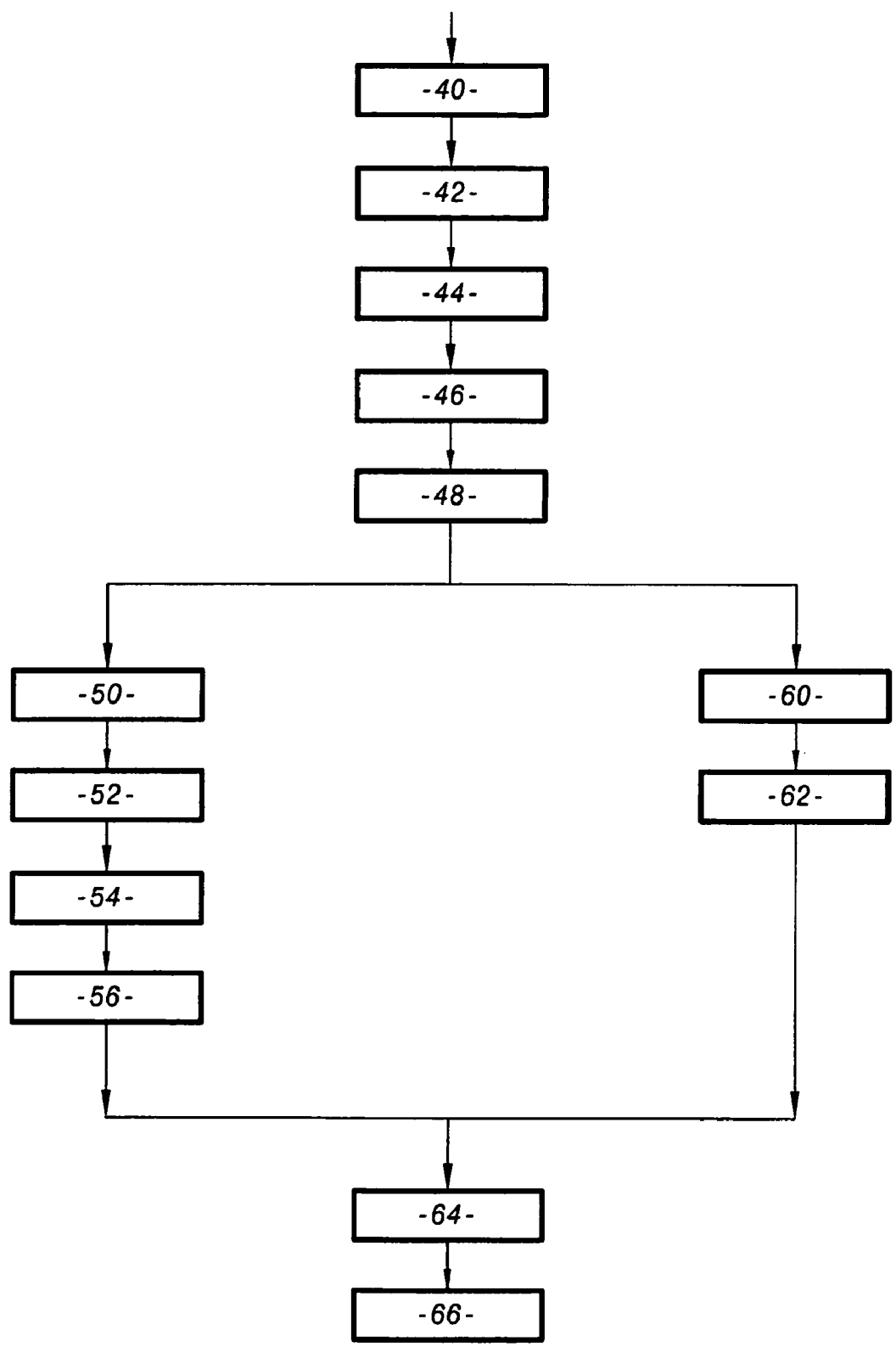
FIG. 4 is a flowchart of a deadbeat control method used in the FIG. 3 system.

Before describing a concrete embodiment of a deadbeat control system and method in detail with reference to FIGS. 3 and 4 (see part III), the mathematical theory behind the development of the system and the method is described in the situation of an isotropic rotary electrical machine (see part I), and the general equations developed in that description are then described in more detail in the specific case of an asynchronous electrical motor (see part II).

The notation introduced in the introductory portion of this description is also used in the remainder of the description.

Part I): Deadbeat Control Equations—General Case

I.1—Expression of the System of State Equations in a Vector Base Specific to the Machine:

To calculate the control vector of the isotropic rotary electrical machine, it is assumed that the system (3) lends itself to automatic control.

As a general rule the two matrices F(T) and G(T) are not known formally. It is possible to determine them in various ways. The calculation method described below based on calculating eigenvalues of the system: $\mu_j$, $j \in \{1, n\}$, demonstrates a simple and accurate analytical solution in that the model of the system is sufficiently well known.

Let D be the diagonal matrix of A whose diagonal consists of the n eigenvalues $\mu_i$ and P the matrix of the eigenvectors (passage matrix) such that:

$$A = P \cdot D \cdot P^{-1} \quad (4)$$

The transition matrix is then simple to calculate:

$$F = e^{A \cdot T} = P \cdot e^{D \cdot T} \cdot P^{-1} \quad (5)$$

Where $e^{D \cdot T}$ is the diagonal matrix consisting of the exponentials of the eigenvalues $\mu_i$ multiplied by the interval T.

Using this method, the discrete system (3) of state equations is written:

$$\vec{X}_c = P \cdot e^{D \cdot T} \cdot P^{-1} \cdot \vec{X}_0 + A^{-1} \cdot (P \cdot e^{D \cdot T} \cdot P^{-1} - I) \cdot B \cdot \vec{V} \quad (6)$$

By multiplying the two left-hand members by $P^{-1}$, there is obtained after a few transformations:

$$[P^{-1} \cdot \vec{X}_c] = e^{D \cdot T} \cdot [P^{-1} \cdot \vec{X}_0] + D^{-1} \cdot (e^{D \cdot T} - I) \cdot [P^{-1} \cdot B] \cdot \vec{V} \quad (7)$$

This new discrete state representation of the machine is beneficial because of its simplicity: $e^{D \cdot T}$ and $D^{-1} \cdot (e^{D \cdot T} - I)$ are diagonal matrices for a given machine, and are very easy to calculate formally from the eigenvalues $\mu_i$. In fact, their respective diagonal is respectively made up of the elements:

$$e^{\mu_j \cdot T} \text{ and } \frac{e^{\mu_j \cdot T} - 1}{\mu_j} \text{ for } j \in \{1, \ldots, n\} \quad (8)$$

This formulation shows the projection of the state vectors into the eigenvector space, i.e. the space of the state "eigenvectors": $\vec{\Psi} = P^{-1} \cdot \vec{X}$, as well as a control "eigenmatrix": $[P^{-1} \cdot B]$.

As the eigenvalues that characterize the behavior of a system these state eigenvectors have a particular physical meaning in that their coordinates, the "eigenstates", are decoupled from the control law, as they are expressed in the eigenvector base. This again reflects the fact that two of the matrices are diagonal.

The following change of variable simplifies the state equation (7):

$$\vec{\Psi}_c = P^{-1} \cdot \vec{X}_c \quad (8)$$

$$\vec{\Psi}_0 = P^{-1} \cdot \vec{X}_0 \quad (9)$$

$$C = D^{-1} \cdot (e^{D \cdot T} - I) \cdot [P^{-1} \cdot B] \quad (10)$$

$$\vec{\Psi}_c = e^{D \cdot T} \cdot \vec{\Psi}_0 + C \cdot \vec{V} \quad (11)$$

Calculation of the control vector then comprises filling in the initial eigenstate $\vec{\Psi}_0$ from measurements and/or observers for the parameters that are not accessible, filling in the set point eigenstate $\vec{\Psi}_c$ as a function of the objectives to be achieved, and finally calculating the control vector enabling the set point eigenstate to be achieved at the end of a selected time interval T.

For a rotary electrical machine, since the objective is to obtain a mechanical force, it is practical to choose a state vector $\vec{X}$ made up of the state of the energization current of the machine and the state of the magnetic flux of the machine. In fact, through a simple vector product, the amplitudes and the angle between a current vector and a magnetic flux vector translate a force objective into objectives as to the coordinates of those vectors in a system of axes chosen to simplify their expressions. Here the system of axes is an orthogonal system of axes whose abscissa axis is aligned with the magnetic flux vector. In this case, the Laplace law vector product is expressed by the product of the modulus of the magnetic flux and the modulus of the projection of the current vector onto the ordinate axis at the same time, ignoring a constant depending on the machine. Moreover, the product of the modulus of the magnetic flux and the modulus of the projection of the current vector onto the abscissa axis at the same time defines the scalar product of the current and magnetic flux vectors and therefore the magnetic energy of the machine in a Park representation, ignoring a multiplication constant depending on the machine.

A matrix $\Gamma_0$ is defined as being the projection matrix of the current vector in an initial system of axes whose abscissa axis is aligned with the initial magnetic flux vector. Here, "initial" means at the time $t_n$ marking the beginning of the interval T. This matrix can be written in the form of the product of two matrices $\Gamma_c$ and $\Gamma_T$ for, in the case of the first, projecting the current vector into a set point system of axes whose abscissa axis is aligned with the set point magnetic flux vector and, in the case of the second, projecting the current vector of that set point system of axes toward the initial system of axes. This transformation $\Gamma_T$ depends of course on the value of the interval T, since it goes from the set point system of axes to the initial system of axes (the system is assumed to be causal with this form of representation). The following relationship is therefore satisfied:

$$\Gamma_T \cdot \Gamma_c = \Gamma_0 \quad (12)$$

Combining relationships (11) and (12) yields:

$$\Gamma_T [\Gamma_c \cdot \vec{\Psi}_c] = e^{D \cdot T} \cdot [\Gamma_0 \cdot \vec{\Psi}_0] + [\Gamma_0 \cdot C] \cdot \vec{V} \quad (13)$$

This formalism shows up the set point state eigenvector $\Gamma_c \cdot \vec{\Psi}_c$ and initial state eigenvector $\Gamma_0 \cdot \vec{\Psi}_0$, respectively expressed in the set point system of axes and in the initial system of axes, which means that the vector and scalar products can be expressed very simply.

The matrices (D, P, P$^{-1}$, B) depend on the machine and may be calculated analytically or numerically. The control interval T is selected on the basis of other criteria. The vector $\vec{\Psi}_0$ depends on the initial state of the machine at the beginning of the interval T and the vector $\vec{\Psi}_c$ is the set point vector. These two vectors $\vec{\Psi}_0$, $\vec{\Psi}_c$ must be recalculated for each control step, together with the three projection matrices: ($\Gamma_0, \Gamma_c, \Gamma_T$). $\Gamma_T$ may be among the unknown variables to be determined as a function of the measured and/or set point values, depending on the application.

1.2—Expression of the Set Point Current:

Here the set point vector is defined to enable simultaneous achievement of a mechanical force set point $F_{mc}$, expressed in the form of a primary torque set point $C_c$, for example, and a set point magnetic flux $\vec{\Phi}_c$ to be achieved at the end of the interval T.

Here only the modulus $\|\Phi_c\|$ of the set point flux $\vec{\Phi}_c$ is necessary.

In a plane defined by the current vector $\vec{I}$ and the magnetic field vector $\vec{B}$, a state vector with at least four dimensions is chosen to define the state of the machine:

$$\vec{X} = \begin{vmatrix} \vec{I} \\ \vec{\Phi} \end{vmatrix} \quad (14)$$

This state vector, applied to the set points, is defined on the basis of a magnetic state and a mechanical force.

To simplify the formalism of the calculations in the case of isotropic asynchronous machines, the current and flux vectors may be represented by a complex number each having two coordinates in a direct orthogonal system of axes in which the real abscissa axis is in the direction of the magnetic field vector and therefore of the magnetic flux vector.

The system (13) remains of the fourth order but is now represented by a second order system in the complex plane.

$\mu_1$ and $\mu_2$ define the two complex eigenvalues of the complex matrix of behavior of the discrete system of state equations; the complex control matrix and the complex inverse passage matrix can be written with these dimensions as follows:

$$B = \begin{vmatrix} b_1 \\ b_2 \end{vmatrix} \quad (15)$$

$$P^{-1} = \begin{vmatrix} p_{11} & p_{12} \\ p_{21} & p_{22} \end{vmatrix} \text{with } P_{jk} \text{ a function of } \mu_1, \mu_2 \quad (16)$$

The control vector $\vec{V}$ is of the first order and complex and is expressed by the relationship $\vec{V} = V_{\alpha+i} \cdot V_\beta \cdot I1$. It is advantageous to choose the coordinates of the system of axes $(\alpha, \beta)$ fixed relative to the control unit.

With the above definitions, $C = D^{-1} \cdot (e^{D \cdot T} - I) \cdot [P^{-1} \cdot B]$ becomes:

$$C = \begin{vmatrix} \dfrac{e^{\mu_1 T} - 1}{\mu_1} \cdot (p_{11} \cdot b_1 + p_{12} \cdot b_2) \\ \dfrac{e^{\mu_2 T} - 1}{\mu_2} \cdot (p_{21} \cdot b_1 + p_{22} \cdot b_2) \end{vmatrix} = \begin{vmatrix} a_1 \\ a_2 \end{vmatrix} \quad (17)$$

Let us use these definitions to detail the system of equations of the state eigenvectors:

$$\vec{\Psi}_c = \begin{vmatrix} p_{11} & p_{12} \\ p_{21} & p_{22} \end{vmatrix} \cdot \begin{vmatrix} \vec{I}_c \\ \vec{\Phi}_c \end{vmatrix} = \begin{vmatrix} \vec{\Psi}_{1c} \\ \vec{\Psi}_{2c} \end{vmatrix} \quad (18)$$

$$\vec{\Psi}_0 = \begin{vmatrix} p_{11} & p_{12} \\ p_{21} & p_{22} \end{vmatrix} \cdot \begin{vmatrix} \vec{I}_0 \\ \vec{\Phi}_0 \end{vmatrix} = \begin{vmatrix} \vec{\Psi}_{10} \\ \vec{\Psi}_{20} \end{vmatrix} \quad (19)$$

-continued $$\vec{\Psi}_c = \begin{vmatrix} e^{\mu_1 \cdot T} & 0 \\ 0 & e^{\mu_2 \cdot T} \end{vmatrix} \cdot \vec{\Psi}_0 + \begin{vmatrix} a_1 \\ a_2 \end{vmatrix} \cdot \vec{V} \quad (20)$$

in which:

$\vec{I}_c$ and $\vec{\Phi}_c$ are respectively the current and set point flux vectors;

$\vec{I}_0$ and $\vec{\Phi}_0$ are respectively the current and flux initial vectors.

Let:

$$e_1 = e^{\mu_1 \cdot T} e_2 = e^{\mu_2 \cdot T}$$

The system of equations becomes:

$$\begin{vmatrix} p_{11} & p_{12} \\ p_{21} & p_{22} \end{vmatrix} \cdot \begin{vmatrix} \vec{I}_c \\ \vec{\Phi}_c \end{vmatrix} = \begin{vmatrix} e_1 \cdot p_{11} \cdot e_1 \cdot p_{12} \\ e_2 \cdot p_{21} \cdot e_2 \cdot p_{22} \end{vmatrix} \cdot \begin{vmatrix} \vec{I}_0 \\ \vec{\Phi}_0 \end{vmatrix} + \begin{vmatrix} a_1 \\ a_2 \end{vmatrix} \cdot \vec{V} \quad (21)$$

It is then divided into two complex equations:

$$p_{11} \cdot \vec{I}_c + p_{12} \cdot \vec{\Phi}_c = e_1 \cdot (p_{11} \cdot \vec{I}_0 + p_{12} \cdot \vec{\Phi}_0) + a_1 \cdot \vec{V} \quad (22)$$

$$p_{21} \cdot \vec{I}_c + p_{22} \cdot \vec{\Phi}_c = e_2 \cdot (p_{21} \cdot \vec{I}_0 + p_{22} \cdot \vec{\Phi}_0) + a_2 \cdot \vec{V} \quad (23)$$

which can equally be written:

$$\vec{\Psi}_{1c} = e_1 \cdot \vec{\Psi}_{10} + a_1 \cdot \vec{V} \quad (24)$$

$$\vec{\Psi}_{2c} = e_2 \cdot \vec{\Psi}_{20} + a_2 \cdot \vec{V} \quad (25)$$

The complex control vector is then eliminated between equations (22) and (23):

$$(a_2 p_{11} - a_1 p_{21}) \cdot \vec{I}_c + (a_2 p_{12} - a_1 p_{22}) \cdot \vec{\Phi}_c = (a_2 \cdot e_1 \cdot p_{11} - a_1 \cdot e_2 p_{21}) \cdot \vec{I}_0 + (a_2 \cdot e_1 \cdot p_{12} - a_1 \cdot e_2 \cdot p_{22}) \cdot \vec{\Phi}_0 \quad (26)$$

This relationship makes it obvious that the set point current vector is linked to the set point flux vector and that both depend on the known initial state of the second member of this equation.

The coefficient $(a_2 \cdot p_{11} - a_1 \cdot p_{21})$ that depends on the application is non-zero because the flux of the rotary electrical machine depends on the energization current of the machine. It is therefore possible to write the following relationship:

$$\vec{I}_c + \frac{a_2 \cdot p_{12} - a_1 \cdot p_{22}}{a_2 \cdot p_{11} - a_1 \cdot p_{21}} \cdot \vec{\Phi}_c = \frac{(a_2 \cdot e_1 \cdot p_{11} - a_1 \cdot e_2 \cdot p_{21}) \cdot \vec{I}_0 + (a_2 \cdot e_1 \cdot p_{12} - a_1 \cdot e_2 \cdot p_{22}) \cdot \vec{\Phi}_0}{a_2 \cdot p_{11} - a_1 \cdot p_{21}} \quad (27)$$

Note that if the coefficient $(a_2 \cdot p_{11} - a_1 \cdot p_{21})$ is zero, the mutual dependency of the set point current and the set point flux across the initial state disappears completely, which in practice means that it is not possible to control the flux vector from the current vector. The flux is therefore either constant or controlled in some other way, and the deadbeat control method described here does not apply.

Let: (28)

$$\vec{E}_0 = \frac{(a_2 \cdot e_1 \cdot p_{11} - a_1 \cdot e_2 \cdot p_{21}) \cdot \vec{I}_0 + (a_2 \cdot e_1 \cdot p_{12} - a_1 \cdot e_2 \cdot p_{22}) \cdot \vec{\Phi}_0}{a_2 \cdot p_{11} - a_1 \cdot p_{21}} = E_0 \cdot e^{i \cdot \varepsilon_0}$$

A more concise form of relationship (27) is obtained:

$$\vec{I}_c + \frac{a_2 \cdot p_{12} - a_1 \cdot p_{22}}{a_2 \cdot p_{11} - a_1 \cdot p_{21}} \cdot \vec{\Phi}_c = E_0 \cdot e^{i \cdot \varepsilon_0} \quad (29)$$

in which the current and flux vectors are represented by a complex expression in the set point system of axes.

$$\vec{I}_c = I_{cd} + i \cdot I_{cq} \quad (30)$$

$$\vec{\Phi}_c = \Phi_{cd} = \|\vec{\Phi}_c\| \quad (31)$$

where $I_{cd}$ is the magnetization current and $I_{cq}$ is the current that in combination with the magnetic flux of the motor creates the mechanical force. It is then possible to write:

$$I_{cd} + i \cdot I_{cq} + \frac{a_2 \cdot p_{12} - a_1 \cdot p_{22}}{a_2 \cdot p_{11} - a_1 \cdot p_{21}} \cdot \vec{\Phi}_c = E_0 \cdot e^{i \cdot \varepsilon_0} \quad (32)$$

Consider two complex vectors: $\vec{M}$ and $\vec{N}$, and $\vec{M}^*$ the conjugate of $\vec{M}$. It is known that:

$$\vec{M}^* \cdot \vec{N} = <\vec{M}, \vec{N}> + i \cdot \|\vec{M} \wedge \vec{N}\| \quad (33)$$

where:

$<\vec{M}, \vec{N}>$ represents the real number scalar of the scalar product of the vectors; and $\|\vec{M} \wedge \vec{N}\|$ represents the modulus of the vector product, which is also a real number. We may therefore write:

$$Re\{\vec{M}^* \cdot \vec{N}\} = <\vec{M}, \vec{N}> \quad (34)$$

$$Im\{\vec{M}^* \cdot \vec{N}\} = \|\vec{M} \wedge \vec{N}\| \quad (35)$$

We now calculate the scalar product of the current and flux vectors, which is equal to the magnetic energy Q, ignoring a constant $k_q$, and the vector product of the same vectors, which is equal to a mechanical force $F_m$, ignoring a constant $k_m$:

$$\vec{I}_c^* \cdot \vec{\Phi}_c = E_0 \cdot e^{-i \cdot \varepsilon_0} \cdot \vec{\Phi}_c - \frac{a_2^* \cdot p_{12}^* - a_1^* \cdot p_{22}^*}{a_2^* \cdot p_{11}^* - a_1^* \cdot p_{21}^*} \cdot \|\vec{\Phi}_c\|^2 \quad (36)$$

$$= \frac{Q}{k_q} + i \cdot \frac{F_m}{k_m}$$

This complex relationship is divided into two real equations:

$$\operatorname{Re}\{\vec{I}_c^* \cdot \vec{\Phi}_c\} = <\vec{I}_c, \vec{\Phi}_c> \quad (37)$$

$$= \frac{Q}{k_q}$$

$$= I_{cd} \cdot \|\vec{\Phi}_c\|$$

$$= E_0 \cdot \cos(\varepsilon_0) \cdot \|\vec{\Phi}_c\| - \operatorname{Re}\left\{\frac{a_2 \cdot p_{12} - a_1 \cdot p_{22}}{a_2 \cdot p_{11} - a_1 \cdot p_{21}}\right\} \cdot \|\vec{\Phi}_c\|^2$$

and, because of the sense of the selected system of axes:

$$\operatorname{Im}\{\vec{I}_c^* \cdot \vec{\Phi}_c\} = -\|\vec{I}_c \wedge \vec{\Phi}_c\| \quad (38)$$

$$= -\frac{F_m}{k_m}$$

$$= I_{cq} \cdot \|\vec{\Phi}_c\|$$

$$= -E_0 \cdot \sin(\varepsilon_0) \cdot \|\vec{\Phi}_c\| + \operatorname{Im}\left\{\frac{a_2 \cdot p_{12} - a_1 \cdot p_{22}}{a_2 \cdot p_{11} - a_1 \cdot p_{21}}\right\} \cdot \|\vec{\Phi}_c\|^2$$

where Re{ ... } and Im{ ... } designate the real and imaginary parts, respectively, of a complex number.

These relationships (37) and (38) are simplified:

$$I_{cd} + \operatorname{Re}\left\{\frac{a_2 \cdot p_{12} - a_1 \cdot p_{22}}{a_2 \cdot p_{11} - a_1 \cdot p_{21}}\right\} \cdot \|\vec{\Phi}_c\| = E_0 \cdot \cos(\varepsilon_0) \quad (39)$$

$$I_{cq} + \operatorname{Im}\left\{\frac{a_2 \cdot p_{12} - a_1 \cdot p_{22}}{a_2 \cdot p_{11} - a_1 \cdot p_{21}}\right\} \cdot \|\vec{\Phi}_c\| = E_0 \cdot \sin(\varepsilon_0) \quad (40)$$

It is then possible to extract $I_{cd}$ from these two equations by eliminating $\varepsilon_0$, in two different forms:

First Form:
$\varepsilon_0$ is calculated from the second equation and it is replaced by its expression in the first equation:

$$\varepsilon_0 = \arcsin\left(\frac{I_{cq}}{E_0} + \operatorname{Im}\left\{\frac{a_2 \cdot p_{12} - a_1 \cdot p_{22}}{a_2 \cdot p_{11} - a_1 \cdot p_{21}}\right\} \cdot \frac{\|\vec{\Phi}_c\|}{E_0}\right) \quad (41)$$

then:

$$I_{cd} = -\operatorname{Re}\left\{\frac{a_2 \cdot p_{12} - a_1 \cdot p_{22}}{a_2 \cdot p_{11} - a_1 \cdot p_{21}}\right\} \cdot \|\vec{\Phi}_c\| + \quad (42)$$

$$E_0 \cdot \cos\left[\arcsin\left(\frac{I_{cq}}{E_0} + \operatorname{Im}\left\{\frac{a_2 \cdot p_{12} - a_1 \cdot p_{22}}{a_2 \cdot p_{11} - a_1 \cdot p_{21}}\right\} \cdot \frac{\|\vec{\Phi}_c\|}{E_0}\right)\right]$$

The context of the application eliminates one of the two main determinations of Arcsin ( ), that with the negative cosine being retained.

Second Form:
The two members of the two equations are squared and added to replace $\cos^2(\varepsilon_0)+\sin^2(\varepsilon_0)=1$ by its numerical value:

$$\left[I_{cd} + \operatorname{Re}\left\{\frac{a_2 \cdot p_{12} - a_1 \cdot p_{22}}{a_2 \cdot p_{11} - a_1 \cdot p_{21}}\right\} \cdot \|\vec{\Phi}_c\|\right]^2 + \quad (43)$$

$$\left[I_{cq} + \operatorname{Im}\left\{\frac{a_2 \cdot p_{12} - a_1 \cdot p_{22}}{a_2 \cdot p_{11} - a_1 \cdot p_{21}}\right\} \cdot \|\vec{\Phi}_c\|\right]^2 = E_0^2$$

This new relationship is expanded to calculate $I_{cd}$ as the solution of a second degree equation:

$$I_{cd} = -\operatorname{Re}\left\{\frac{a_2 \cdot p_{12} - a_1 \cdot p_{22}}{a_2 \cdot p_{11} - a_1 \cdot p_{21}}\right\} \cdot \|\vec{\Phi}_c\| \pm \quad (44)$$

$$\sqrt{E_0^2 - \left[I_{cq} + \operatorname{Im}\left\{\frac{a_2 \cdot p_{12} - a_1 \cdot p_{22}}{a_2 \cdot p_{11} - a_1 \cdot p_{21}}\right\} \cdot \|\vec{\Phi}_c\|\right]^2}$$

Squaring introduces a foreign root that has to be eliminated by means of the context of the application, retaining only that having the negative sign in front of the radical.

Note further that:

$$I_{cq} \cdot \|\vec{\Phi}_c\| = \frac{F_m}{k_m} \quad (45)$$

This relationship is therefore used to transform a mechanical force set point $F_{mc}$ and a magnetic flux modulus set point $\|\vec{\Phi}_c\|$ into a set point for the projection of the current vector onto the axis orthogonal to the flux vector axis:

$$I_{cq} = \frac{F_{mc}}{k_m \cdot \|\vec{\Phi}_c\|} \quad (46)$$

One or the other of the solutions for $I_{cd}$ then depends on:

the set points $F_{mc}, \|\vec{\Phi}_c\|$;

the parameters of the application: $a_1, a_2, p_{11}, p_{12}, p_{21}, p_{22}$, depending on the eigenvalues;

the measured initial conditions: $\vec{I}_0, \vec{\Phi}_0$ through the intermediary of $\vec{E}_0$.

The two forms of the relationship linking the magnetization current to the primary set points, parameters and initial state therefore enable calculation of the second coordinate of the set point current, the projection of the set point current vector onto the magnetic flux vector.

$$I_{cd} = -\operatorname{Re}\left\{\frac{a_2 \cdot P_{12} - a_1 \cdot P_{22}}{a_2 \cdot P_{11} - a_1 P_{21}}\right\} \cdot \|\vec{\Phi}_c\| + \quad (47)$$

$$E_0 \cdot \cos\left[\arcsin\left(\frac{F_{mc}}{k_m \cdot \|\vec{\Phi}_c\| E_0} + \operatorname{Im}\left\{\frac{a_2 \cdot P_{12} - a_1 \cdot P_{22}}{a_2 \cdot P_{11} - a_1 \cdot P_{21}}\right\} \cdot \frac{\|\vec{\Phi}_c\|}{E_0}\right)\right], \text{ or}$$

$$I_{cd} = \operatorname{Re}\left\{\frac{a_2 \cdot P_{12} - a_1 \cdot P_{22}}{a_2 \cdot P_{11} - a_1 \cdot P_{21}}\right\} \cdot \|\vec{\Phi}_c\| \pm \quad (48)$$

$$\sqrt{E_0^2 - \left[\frac{F_{mc}}{k_m \cdot \|\vec{\Phi}_c\|} + \operatorname{Im}\left\{\frac{a_2 \cdot P_{12} - a_1 \cdot P_{22}}{a_2 \cdot P_{11} - a_1 \cdot P_{21}}\right\} \cdot \|\vec{\Phi}_c\|\right]^2}$$

To summarize, we obtain $(I_{cd}, I_{cq})$ and $(\Phi_{cd}, 0)$ from $(F_{mc}, \|\vec{\Phi}_c\|)$ using the preceding relationships, enabling us to construct the set point state eigenvector projected into the set point system of axes:

$$\Gamma_c \cdot \vec{\Psi}_c = \begin{vmatrix} P_{11} \cdot (I_{cd} + i \cdot I_{cq}) + P_{12} \cdot \Phi_{cd} \\ P_{21} \cdot (I_{cd} + i \cdot I_{cq}) + P_{22} \cdot \Phi_{cd} \end{vmatrix} = \begin{vmatrix} \vec{\Psi}_{1c}^{dq} \\ \vec{\Psi}_{2c}^{dq} \end{vmatrix} \quad (49)$$

from the relationship:

$$\Gamma_T \cdot [\Gamma_c \cdot \vec{\Psi}_c] = e^{D \cdot T} \cdot [\Gamma_0 \cdot \vec{\Psi}_0] + [\Gamma_0 \cdot C] \cdot \vec{V} \quad (50)$$

The set point current vector established in this way enables us to obtain simultaneously, at the end of the interval T, both the mechanical force set point $F_{mc}$ and the flux set point $\|\vec{\Phi}_c\|$.

We can likewise write:

$$\Gamma_0 \cdot \vec{\Psi}_0 = \begin{vmatrix} P_{11} \cdot (I_{0d_0} + i \cdot I_{0q_0}) + P_{12} \cdot \Phi_{0d_0} \\ P_{21} \cdot (I_{0d_0} + i \cdot I_{0q_0}) + P_{22} \cdot \Phi_{0d_0} \end{vmatrix} = \begin{vmatrix} \vec{\Psi}_{10}^{d_0 q_0} \\ \vec{\Psi}_{20}^{d_0 q_0} \end{vmatrix} \quad (51)$$

initial state known from measurement.

I.3—Example of Establishing the Matrix $\Gamma_T$ for an Asynchronous Electric Motor Because the control vector is applied here to a three-phase rotary electrical motor in a system of axes fixed relative to the stator, a state vector is selected that is made up of the stator current vector $\vec{I}_s$ and the rotor flux vector $\Phi_r$ as seen from the stator in the orthogonal system of axes usually called $(\alpha, \beta)$, fixed relative to the stator of the motor after reduction by the number of pairs of magnetic poles of the motor. The Concordia transformation is used for this change from the three-phase system to the two-phase system in this reference orthogonal system of axes $(\alpha, \beta)$. The $\alpha$ axis may be selected in the electrical polar direction of the phase R, for example.

The stator current vector can be measured with the aid of current sensors disposed externally of the motor and in series with the phases or some of the phases of the motor. The rotor flux vector is known from the motor voltages and currents or can be observed. These two vectors are used to estimate or calculate an initial state. They are also used conjointly to translate a mechanical torque set point by their vector product and therefore by their coordinates as well as a magnetic energy set point, if necessary.

The selected state vector is therefore 4-dimensional in this case. There are four electrical degrees of freedom. It may be denoted interchangeably with two vectors selected to simplify the notation or with complex numbers representing them in the complex system of axes $(\alpha, \beta)$, $\beta$ being the pure imaginary axis, to simplify the calculation of the eigenvalues by reducing the rank of the matrices from four to two (in the complex plane).

$$\vec{X} = \begin{vmatrix} \vec{I}_s \\ \vec{\Phi}_r \end{vmatrix} = \begin{vmatrix} I_{s\alpha} + i \cdot I_{s\beta} \\ \Phi_{r\alpha} + i \cdot \Phi_{r\beta} \end{vmatrix} \quad (52)$$

The second advantage of this formalism using complex numbers is that it translates rotations of the coordinate axes by a simple exponential complex scalar instead of using a 2-dimensional square complex matrix.

The matrix $\Gamma_T$ can then be written in the following complex form:

$$\Gamma_T = e^{i \cdot \Delta \theta_p} \quad (53)$$

where $\Delta \theta_p$ represents the predicted angular rotation of the flux during the interval T.

With this choice of state variables, the initial state eigenvectors can be specified:

$$\Gamma_0 \cdot \vec{\Psi}_0 = \begin{vmatrix} \vec{\Psi}_{10}^{d_0 q_0} \\ \vec{\Psi}_{20}^{d_0 q_0} \end{vmatrix} = \begin{vmatrix} p_{11} \cdot (I_{0d_0} + i \cdot I_{0q_0}) + p_{12} \cdot \Phi_{0q_0} \\ p_{21} \cdot (I_{0d_0} + i \cdot I_{0q_0}) + p_{22} \cdot \Phi_{0d_0} \end{vmatrix} \quad (54)$$

The variables $(I_{0d_0}, I_{0q_0})(\Phi_{0d_0}, 0)$ represent the initial state of the state eigenvectors projected into the initial system of axes defined by the transform $\Gamma_0 = e^{-i \cdot \theta_0}$ relative to the fixed reference system of axes $(\alpha, \beta)$. The initial values $(I_{0d_0}, I_{0q_0})$ $(\Phi_{0d_0}, 0)$ and $\Gamma_0 = e^{-i \cdot \theta_0}$ are known from the measured currents and the observed flux.

The general equation of the state eigenvectors projected into the initial and set point frames of reference becomes:

$$e^{i \cdot \Delta \theta_p} \cdot \begin{vmatrix} P_{11} \cdot (I_{cd} + i \cdot I_{cq}) + P_{12} \cdot \Phi_{cd} \\ P_{21} \cdot (I_{cd} + i \cdot I_{cq}) + P_{22} \cdot \Phi_{cd} \end{vmatrix} = \quad (55)$$

$$= \begin{vmatrix} e^{\mu_1 \cdot T} & 0 \\ 0 & e^{\mu_2 \cdot T} \end{vmatrix} \cdot \begin{vmatrix} P_{11} \cdot (I_{0d_0} + i \cdot I_{0q_0}) + P_{12} \cdot \Phi_{0d_0} \\ P_{21} \cdot (I_{0d_0} + i \cdot I_{0q_0}) + P_{22} \cdot \Phi_{0d_0} \end{vmatrix} + e^{-i \cdot \theta_0} \cdot \begin{vmatrix} a_1 \\ a_2 \end{vmatrix} \cdot \vec{V}$$

This system can be detailed again in the form of two complex equations:

$$e^{i \cdot \Delta \theta_p} \cdot [p_{11} \cdot (I_{cd} + i \cdot I_{cq}) + p_{12} \cdot \Phi_{cd}] = e^{\mu_1 \cdot T} \cdot [p_{11} \cdot (I_{0d_0} + i \cdot I_{0q_0}) + p_{12} \cdot \Phi_{0d_0}] + e^{-i \cdot \theta_0} \cdot a_1 \cdot \vec{V} \quad (56)$$

$$e^{i \cdot \Delta \theta_p} \cdot [p_{21} \cdot (I_{cd} + i \cdot I_{cq}) + p_{22} \cdot \Phi_{cd}] = e^{\mu_2 \cdot T} \cdot [p_{21} \cdot (I_{0d_0} + i \cdot I_{0q_0}) + p_{22} \cdot \Phi_{0d_0}] + e^{-i \cdot \theta_0} \cdot a_2 \cdot \vec{V} \quad (57)$$

The control vector is again eliminated between these two complex equations:

$$\Gamma_T = e^{i \cdot \Delta \theta_p} \quad (58)$$

$$= \frac{e^{\mu_1 \cdot T} \cdot a_2 \cdot [p_{11} \cdot (I_{0d_0} + i \cdot I_{0q_0}) + p_{12} \cdot \Phi_{0d_0}] - e^{\mu_2 \cdot T} \cdot a_1 \cdot [p_{21} \cdot (I_{0d_0} + i \cdot I_{0q_0}) + p_{22} \cdot \Phi_{0d_0}]}{a_2 \cdot [p_{11} \cdot (I_{cd} + i \cdot I_{cq}) + p_{12} \cdot \Phi_{cd}] - a_1 \cdot [p_{21} \cdot (I_{cd} + i \cdot I_{cq}) + p_{22} \cdot \Phi_{cd}]}$$

or:

$$\Gamma_T = \frac{e^{\mu_1 \cdot T} \cdot a_2 \cdot \vec{\Psi}_{10}^{d_0 q_0} - e^{\mu_2 \cdot T} \cdot a_1 \cdot \vec{\Psi}_{20}^{d_0 q_0}}{a_2 \cdot \vec{\Psi}_{1c}^{dq} - a_1 \cdot \vec{\Psi}_{2c}^{dq}} \quad (59)$$

The transform between the initial system of axes and the set point system of axes can now be calculated.

To summarize, $\Gamma_T \cdot [\Gamma_c \cdot \vec{\Psi}_c]$ is now entirely defined by the primary set points $(F_{mc}, \|\vec{\Phi}_c\|)$ The System:

$$\Gamma_T[\Gamma_c \cdot \vec{\Psi}_c] = e^{D \cdot T} \cdot [\Gamma_0 \cdot \vec{\Psi}_0] + [\Gamma_0 \cdot C_f] \cdot \vec{V} \quad (60)$$

is of the $4^{th}$ order (real) or $2^{nd}$ order (complex) and has been used only twice: once to calculate $I_{cd}$ generally and once to calculate $\Delta\theta_p$ in the case of a rotary motor.

I.4—Calculation of the Control Vector:

The only unknowns of the system of state equations are now the two real coordinates of the control vector, which are the solutions of one of the following two complex equations:

$$e^{i \cdot \Delta\theta_p} \cdot [p_{11} \cdot (I_{cd} + i \cdot I_{cq}) + p_{12} \cdot \Phi_{cd}] = e^{\mu_1 \cdot T} \cdot [p_{11} \cdot (I_{0d_0} + i \cdot I_{0q_0}) + p_{12} \cdot \Phi_{0d_0}] + e^{-i \cdot \theta_0} \cdot a_1 \cdot \vec{V} \quad (61)$$

$$e^{i \cdot \Delta\theta_p} \cdot [p_{21} \cdot (I_{cd} + i \cdot I_{cq}) + p_{22} \cdot \Omega_{cd}] = e^{\mu_2 \cdot T} \cdot [p_{21} \cdot (I_{0d_0} + i \cdot I_{0q_0}) + p_{22} \cdot \Omega_{0d_0}] + e^{-i \cdot \theta_0} \cdot a_2 \cdot \vec{V} \quad (62)$$

which can be formalized simply by now eliminating $\Gamma_T$:

$$\vec{V} = e^{i\theta_0} \cdot \frac{\begin{array}{l} e^{\mu_1 \cdot T} \cdot [p_{11} \cdot (I_{0d_0} + i \cdot I_{0q_0}) + p_{12} \cdot \Phi_{0d_0}] \cdot \\ [p_{21} \cdot (I_{cd} + i \cdot I_{cq}) + p_{22} \cdot \Phi_{cd}] - e^{\mu_2 \cdot T} \cdot \\ [p_{21} \cdot (I_{0d_0} + i \cdot I_{0q_0}) + p_{22} \cdot \Phi_{0d_0}] \cdot \\ [p_{11} \cdot (I_{cd} + i \cdot I_{cq}) + p_{12} \cdot \Phi_{cd}] \end{array}}{a_2 \cdot [p_{11} \cdot (I_{cd} + i \cdot I_{cq}) + p_{12} \cdot \Phi_{cd}] - a_1 \cdot [p_{21} \cdot (I_{cd} + i \cdot I_{cq}) + p_{22} \cdot \Phi_{cd}]} \quad (63)$$

$$\vec{V} = e^{i\theta_0} \cdot \frac{e^{\mu_1 \cdot T} \cdot \vec{\Psi}_{10}^{d_0 q_0} \cdot \vec{\Psi}_{2c}^{dq} - e^{\mu_2 \cdot T} \cdot \vec{\Psi}_{20}^{d_0 q_0} \cdot \vec{\Psi}_{1c}^{dq}}{a_2 \cdot \vec{\Psi}_{1c}^{dq} - a_1 \cdot \vec{\Psi}_{2c}^{dq}} \quad (64)$$

This is a complex relation, which supplies the last two unknowns: the coordinates of the control vector.

It can now be concluded that the system of 4-dimensional state equations has been inverted in the case of an isotropic rotary motor and that we have found the exact analytical expression for the four unknowns: $I_{cd}, \Delta\theta_p$, and $(\nabla_\alpha, \nabla_\beta)$, from the primary set points:

$(F_{mc}, \|\vec{\Phi}_c\mu)$.

Part II—Application to the Asynchronous Rotary Motor:

The asynchronous rotary motor is an isotropic rotary motor.

Figure 1:
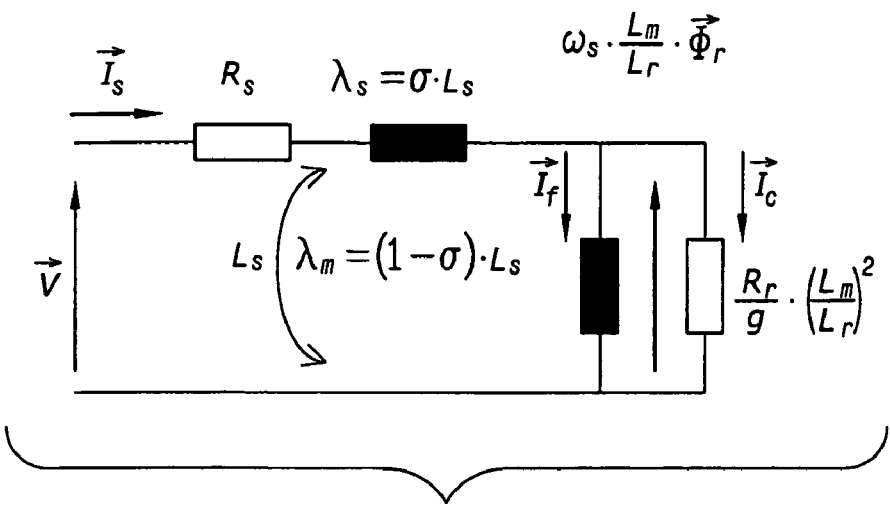
FIG. 1 is an equivalent circuit of an asynchronous electrical motor.

In the case of the asynchronous motor the FIG. 1 equivalent circuit, which lumps together the leakage inductances of the rotor and the stator with the stator of the motor is used, after the Concordia three-phase to two-phase transform. This equivalent circuit has the advantage of showing simply the separation of the stator current into its two components: the current creating the rotor flux and the current creating the torque.

II.1—Asynchronous Motor State Representation:

Using the corresponding electrical differential equations, it is easy to demonstrate that the linear system of continuous state equations may be written in the form:

$$\begin{vmatrix} I_{s\alpha} + i \cdot I_{s\beta} \\ \Phi_{r\alpha} + i \cdot \Phi_{r\beta} \end{vmatrix} = \begin{vmatrix} -\gamma & \beta \cdot (\alpha - i \cdot \omega) \\ \alpha \cdot L_m & -(\alpha - i \cdot \omega) \end{vmatrix} \cdot \begin{vmatrix} I_{s\alpha} + i \cdot I_{s\beta} \\ \Phi_{r\alpha} + i \cdot \Phi_{r\beta} \end{vmatrix} + \begin{vmatrix} \frac{1}{\lambda} \\ 0 \end{vmatrix} \cdot (V_{s\alpha} + i \cdot V_{s\beta}) \quad (65)$$

and therefore:

$$A = \begin{vmatrix} -\gamma & \beta \cdot (\alpha - i \cdot \omega) \\ \alpha \cdot L_m & -(\alpha - i \cdot \omega) \end{vmatrix} \quad (66)$$

$$B = \begin{vmatrix} \frac{1}{\lambda} \\ 0 \end{vmatrix}$$

with:
stator resistance: $R_s$
rotor resistance: $R_r$
stator leakage inductance: $l_s$
rotor leakage inductance: $l_r$
mutual inductance: $L_m$
stator inductance:

$$L_s = L_m + l_s$$

rotor inductance:

$$L_r = L_m + l_r$$

stator time constant:

$$\tau_s = \frac{L_s}{R_s}$$

rotor time constant:

$$\tau_r = \frac{L_r}{R_r}$$

number of pole pairs: $N_p$
dispersion coefficient:

$$\sigma = 1 - \frac{L_m^2}{L_r \cdot L_s}$$

Definitions of mechanical and electrical angular frequencies and notation:
mechanical angular frequency of the rotor: $\Omega$
polar mechanical angular frequencies: $\omega = N_p \cdot \Omega$
stator electrical angular frequency: $\omega_s$
rotor electrical angular frequency: $\omega_r$
slippage:

$$g = \frac{(\omega_s - \omega)}{\omega_s} = \frac{\omega_r}{\omega_s}$$

and:

$$R_{sr} = R_s + R_r \cdot \frac{L_m^2}{L_r^2} \quad (67)$$

$$\alpha = \frac{1}{\tau_r} \quad (68)$$

$$\beta = \frac{L_m}{\sigma \cdot L_s \cdot L_r} = \frac{1 - \sigma}{\sigma} \cdot \frac{1}{L_m} \quad (69)$$

$$\lambda = \sigma \cdot L_s \quad (70)$$

$$\gamma = \frac{1}{\sigma} \cdot \left[ \frac{1}{\tau_s} + \frac{(1 - \sigma)}{\tau_r} \right] = \frac{R_{sr}}{\lambda} \quad (71)$$

II.2—Expressing the System of State Equations in an Eigenvector Base:

The characteristic equation giving the eigenvalues $\mu_1$ of the matrix A is:

$$\mu^2+(\alpha+\gamma-i\cdot\omega)\cdot\mu+(\gamma-\alpha\cdot\beta\cdot L_m)\cdot(\alpha-i\cdot\omega)=0 \tag{72}$$

Let $\Delta$ denote the discriminant of the equation:

$$\Delta=(\alpha-\gamma-i\cdot\omega)^2+4\cdot\alpha\cdot\beta\cdot L_m\cdot(\alpha-i\cdot\omega) \tag{73}$$

The two eigenvalues are therefore expressed by:

$$\mu_1 = -\frac{1}{2}\cdot(\alpha+\gamma-i\cdot\omega-\sqrt{\Delta}) \tag{74}$$

$$\mu_2 = -\frac{1}{2}\cdot(\alpha+\gamma-i\cdot\omega+\sqrt{\Delta}) \tag{75}$$

Note here that the eigenvalues depend on the polar mechanical angular frequency. They must therefore be calculated from the model of the motor, the measured speed and the number of pole pairs.

$$\omega=N_p\cdot\Omega \tag{76}$$

The diagonalized matrix A is:

$$D = \begin{vmatrix} \mu_1 & 0 \\ 0 & \mu_2 \end{vmatrix} \tag{77}$$

The eigenvectors $$\left(\vec{\Pi}_1 = \begin{vmatrix} p_{11} \\ p_{21} \end{vmatrix}, \vec{\Pi}_2 = \begin{vmatrix} p_{12} \\ p_{22} \end{vmatrix}\right)$$

corresponding to the eigenvalues are one solution of the equation:

$$(A-\mu_1\cdot I)\cdot\Pi_i=0 \tag{78}$$

For the first eigenvector, defined to within a multiplier constant:

$$\begin{vmatrix} -\gamma & \beta\cdot(\alpha-i\cdot\omega) \\ \alpha\cdot L_m & -(\alpha-i\cdot\omega) \end{vmatrix} \cdot \begin{vmatrix} p_{11} \\ p_{21} \end{vmatrix} = \mu_1 \cdot \begin{vmatrix} p_{11} \\ p_{21} \end{vmatrix} \tag{79}$$

The second line of the matrix equation yields the following relationship:

$$\alpha\cdot L_m\cdot p_{11}=(\mu_1+\alpha-i\cdot\omega)\cdot p_{21} \tag{80}$$

which enables us to select:

$$p_{11} = \frac{2\cdot(\mu_1+\alpha-i\cdot\omega)}{2\cdot\alpha\cdot L_m} = \frac{\alpha-\gamma-i\cdot\omega+\sqrt{\Delta}}{2\cdot\alpha\cdot L_m} \tag{81}$$

$$p_{21} = 1 \tag{82}$$

In a similar way, for the second eigenvector, defined to within a multiplication constant:

$$p_{12} = \frac{2\cdot(\mu_2+\alpha-i\cdot\omega)}{2\cdot\alpha\cdot L_m} = \frac{\alpha-\gamma-i\cdot\omega-\sqrt{\Delta}}{2\cdot\alpha\cdot L_m} \tag{83}$$

$$p_{22} = 1 \tag{84}$$

The passage matrix $$P = \begin{vmatrix} \vec{\Pi}_1 & \vec{\Pi}_2 \end{vmatrix} = \begin{vmatrix} p_{11} & p_{12} \\ p_{21} & p_{22} \end{vmatrix}$$

such that: $A\cdot P=P\cdot D$ may therefore be written:

$$P = \begin{vmatrix} \frac{\alpha-\gamma-i\cdot\omega+\sqrt{\Delta}}{2\cdot\alpha\cdot L_m} & \frac{\alpha-\gamma-i\cdot\omega-\sqrt{\Delta}}{2\cdot\alpha\cdot L_m} \\ 1 & 1 \end{vmatrix} \tag{85}$$

or, using eigenvalues:

$$P = \frac{1}{\alpha\cdot L_m} \cdot \begin{vmatrix} -(\mu_2+\gamma) & -(\mu_1+\gamma) \\ \alpha\cdot L_m & \alpha\cdot L_m \end{vmatrix} \tag{86}$$

and its inverse may therefore be written:

$$P^{-1} = \frac{1}{2\sqrt{\Delta}} \cdot \begin{vmatrix} 2\cdot\alpha\cdot L_m & -(\alpha-\gamma-i\cdot\omega-\sqrt{\Delta}) \\ -2\cdot\alpha\cdot L_m & (\alpha-\gamma-i\cdot\omega+\sqrt{\Delta}) \end{vmatrix} \tag{87}$$

or, using eigenvalues:

$$P^{-1} = \frac{1}{\mu_1-\mu_2} \cdot \begin{vmatrix} \alpha\cdot L_m & (\mu_1+\gamma) \\ -\alpha\cdot L_m & -(\mu_2+\gamma) \end{vmatrix} \tag{88}$$

We can therefore now write:

$$A=P\cdot D\cdot P^{-1} \tag{89}$$

With the notation using eigenvalues, A becomes:

$$A = \begin{vmatrix} -\gamma & -\frac{(\mu_1+\gamma)\cdot(\mu_2+\gamma)}{\alpha\cdot L_m} \\ \alpha\cdot L_m & (\mu_1+\mu_2+\gamma) \end{vmatrix} \tag{90}$$

Using the following relationship resulting from combining the intermediate variables:

$$(\mu_1+\gamma)\cdot(\mu_2+\gamma)=\alpha\cdot\beta L_m\cdot(\mu_1+\mu_2+\gamma) \tag{91}$$

$$A = \begin{vmatrix} -\gamma & -\frac{(\mu_1+\gamma)\cdot(\mu_2+\gamma)}{\alpha\cdot L_m} \\ \alpha\cdot L_m & \frac{(\mu_1+\gamma)\cdot(\mu_2+\gamma)}{\alpha\cdot L_m\cdot\beta} \end{vmatrix} \tag{92}$$

Using the following reduced variables:

$$\xi_0 = \frac{\mu_1 - \mu_2}{\alpha \cdot L_m} \quad (93)$$

$$\xi_1 = \frac{\mu_1 + \gamma}{\alpha \cdot L_m}$$

$$\xi_2 = \frac{\mu_2 + \gamma}{\alpha \cdot L_m}$$

To summarize:

$$A = \alpha \cdot L_m \cdot \begin{vmatrix} -\xi & -\xi_1 \cdot \xi_2 \\ 1 & \frac{\xi_1 \cdot \xi_2}{\beta} \end{vmatrix} \quad (94)$$

$$D = \begin{vmatrix} \mu_1 & 0 \\ 0 & \mu_2 \end{vmatrix}$$

$$P = \begin{vmatrix} -\xi_2 & -\xi_1 \\ 1 & 1 \end{vmatrix} \quad (95)$$

$$P^{-1} = \frac{1}{\xi_0} \cdot \begin{vmatrix} 1 & \xi_1 \\ -1 & -\xi_2 \end{vmatrix}$$

Replacing $F = e^{A \cdot T}$ with $F = P \cdot e^{D \cdot T} \cdot P^{-1}$, we can now write:

$$[P^{-1} \cdot \vec{X}_c] = e^{D \cdot T} \cdot [P^{-1} \cdot \vec{X}_0] + D^{-1} \cdot (e^{D \cdot T} - I) \cdot [P^{-1} \cdot B] \cdot \vec{V} \quad (96)$$

where:

$$e^{D \cdot T} = \begin{vmatrix} e^{\mu_1 \cdot T} & 0 \\ 0 & e^{\mu_2 \cdot T} \end{vmatrix} \quad (97)$$

$$D^{-1} = \begin{vmatrix} \frac{1}{\mu_1} & 0 \\ 0 & \frac{1}{\mu_2} \end{vmatrix}$$

$$P^{-1} \cdot B = \frac{1}{\lambda \cdot \xi_0} \cdot \begin{vmatrix} 1 \\ -1 \end{vmatrix}$$

A particularly simple form is obtained:

$$\begin{vmatrix} 1 & \xi_1 \\ 1 & \xi_2 \end{vmatrix} \cdot \vec{X}_c = \begin{vmatrix} e^{\mu_1 \cdot T} & 0 \\ 0 & e^{\mu_2 \cdot T} \end{vmatrix} \cdot \begin{vmatrix} 1 & \xi_1 \\ 1 & \xi_2 \end{vmatrix} \cdot \vec{X}_0 + \frac{\vec{V}}{\lambda} \cdot \begin{vmatrix} \frac{e^{\mu_1 \cdot T} - 1}{\mu_1} \\ \frac{e^{\mu_2 \cdot T} - 1}{\mu_2} \end{vmatrix} \quad (98)$$

We recognize the general formalism of the method:

$$\vec{\Psi}_c = e^{D \cdot T} \cdot \vec{\Psi}_0 + C \cdot \vec{V} \quad (99)$$

where:

$$\vec{\Psi}_c = \begin{vmatrix} 1 & \xi_1 \\ 1 & \xi_2 \end{vmatrix} \cdot \vec{X}_c = \begin{vmatrix} \vec{\Psi}_{1c} \\ \vec{\Psi}_{2c} \end{vmatrix} \quad (100)$$

$$\vec{\Psi}_0 = \begin{vmatrix} 1 & \xi_1 \\ 1 & \xi_2 \end{vmatrix} \cdot \vec{X}_0 = \begin{vmatrix} \vec{\Psi}_{10} \\ \vec{\Psi}_{20} \end{vmatrix}$$

-continued $$e^{D \cdot T} = \begin{vmatrix} e^{\mu_1 \cdot T} & 0 \\ 0 & e^{\mu_2 \cdot T} \end{vmatrix} \quad (101)$$

$$C = \frac{1}{\lambda} \cdot \begin{vmatrix} \frac{e^{\mu_1 \cdot T} - 1}{\mu_1} \\ \frac{e^{\mu_2 \cdot T} - 1}{\mu_2} \end{vmatrix}$$

The coordinates of the state "eigenvectors" may be caused to appear very simply by replacing the state vectors with their vector coordinates:

$$\begin{vmatrix} \vec{I}_{sc} + \xi_1 \cdot \vec{\Phi}_{rc} \\ \vec{I}_{sc} + \xi_2 \cdot \vec{\Phi}_{rc} \end{vmatrix} = \begin{vmatrix} e^{\mu_1 \cdot T} \cdot (\vec{I}_{s0} + \xi_1 \cdot \vec{\Phi}_{r0}) \\ e^{\mu_2 \cdot T} \cdot (\vec{I}_{s0} + \xi_2 \cdot \vec{\Phi}_{r0}) \end{vmatrix} + \frac{\vec{V}}{\lambda} \cdot \begin{vmatrix} \frac{e^{\mu_1 \cdot T} - 1}{\mu_1} \\ \frac{e^{\mu_2 \cdot T} - 1}{\mu_2} \end{vmatrix} \quad (102)$$

The coordinates of the state, initial and set point "eigenvectors" are now:

$$\vec{\Psi}_{10} = \vec{I}_{s0} + \xi_1 \cdot \vec{\Phi}_{r0} \quad \vec{\Psi}_{20} = \vec{I}_{s0} + \xi_2 \cdot \vec{\Phi}_{r0} \quad (103)$$

$$\vec{\Psi}_{1c} = \vec{I}_{sc} + \xi_2 \cdot \vec{\Phi}_{rc} \quad \vec{\Psi}_{2c} = \vec{I}_{sc} + \xi_2 \cdot \vec{\Phi}_{rc} \quad (104)$$

which yields the following relationships by setting:

$$a_1 = \frac{e^{\mu_1 \cdot T} - 1}{\lambda \cdot \mu_1} \quad (105)$$

$$a_2 = \frac{e^{\mu_2 \cdot T} - 1}{\lambda \cdot \mu_2}$$

$$\vec{\Psi}_{1c} = e^{\mu_1 \cdot T} \cdot \vec{\Psi}_{10} + a_1 \cdot \vec{V} \quad (106)$$

$$\vec{\Psi}_{2c} = e^{\mu_2 \cdot T} \cdot \vec{\Psi}_{20} + a_2 \cdot \vec{V} \quad (107)$$

When the parameters of the motor are known, it is a simple matter to calculate the various reduced parameters involved in the equation for a given mechanical speed ω and for a given prediction horizon T. The coordinates of the initial state eigenvector ($\vec{\Psi}_{10}, \vec{\Psi}_{20}$) are also known in the system of axes (α,β) from the measured currents $\vec{I}_{s0}$ and the flux $\vec{\Phi}_{r0}$ as measured or estimated by an observer. Thus, to be able to calculate the unknown: the control vector $\vec{V}$ in the system of axes (α,β), it remains only to fix the set point state eigenvectors at the prediction horizon T.

II.3—Establishing the Set Point Current:

To fix the rotor flux and electromagnetic torque set points specific to the asynchronous motor, it is now necessary to fix the scalar product of the current and flux vectors, which yields the magnetic energy, and their vector product, which yields the torque, from Laplace's law.

Note now that the current and flux vectors referred to here are considered at the same time, at the end of the interval T. Moreover we prepare to calculate the control vector to be applied so that these set points are obtained simultaneously at the end of the interval T taking account of the electrical time constants by way of the model. The calculation is therefore an exact calculation necessitating no slaving or decoupling of the two axes.

Figure 2A:
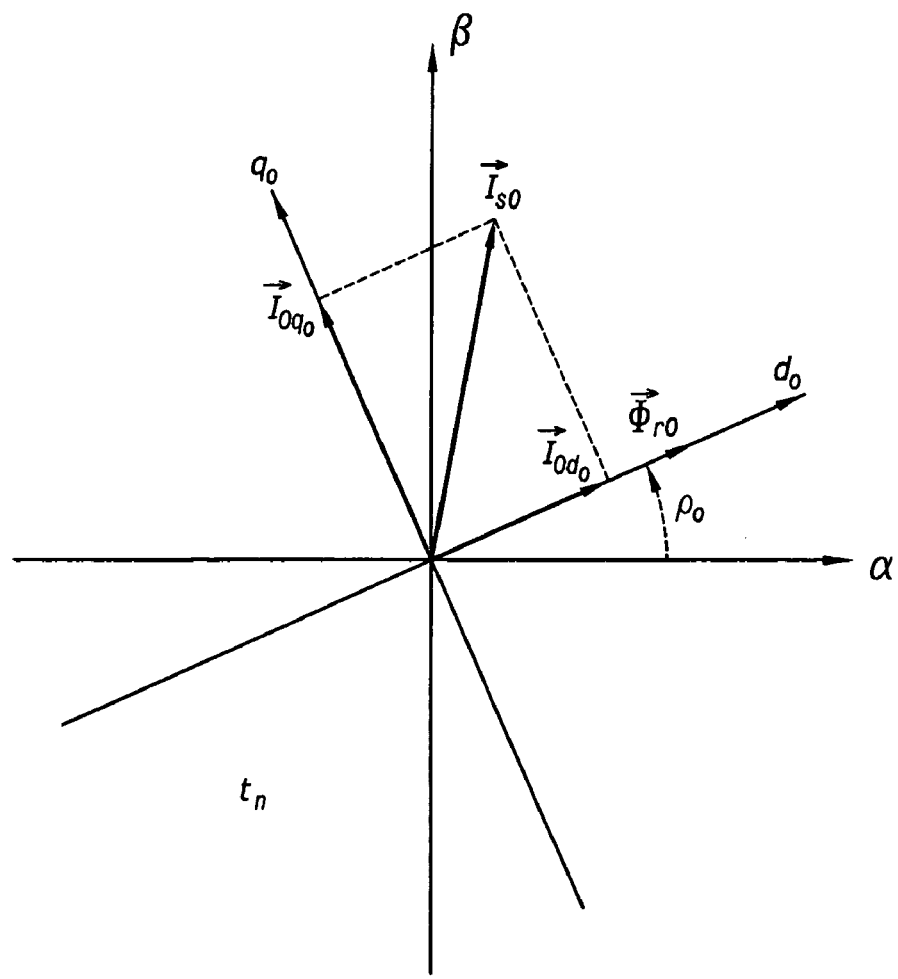
FIGS. 2A and 2B respectively define an initial system of axes and a set point system of axes used in a deadbeat control method.
Figure 2B:
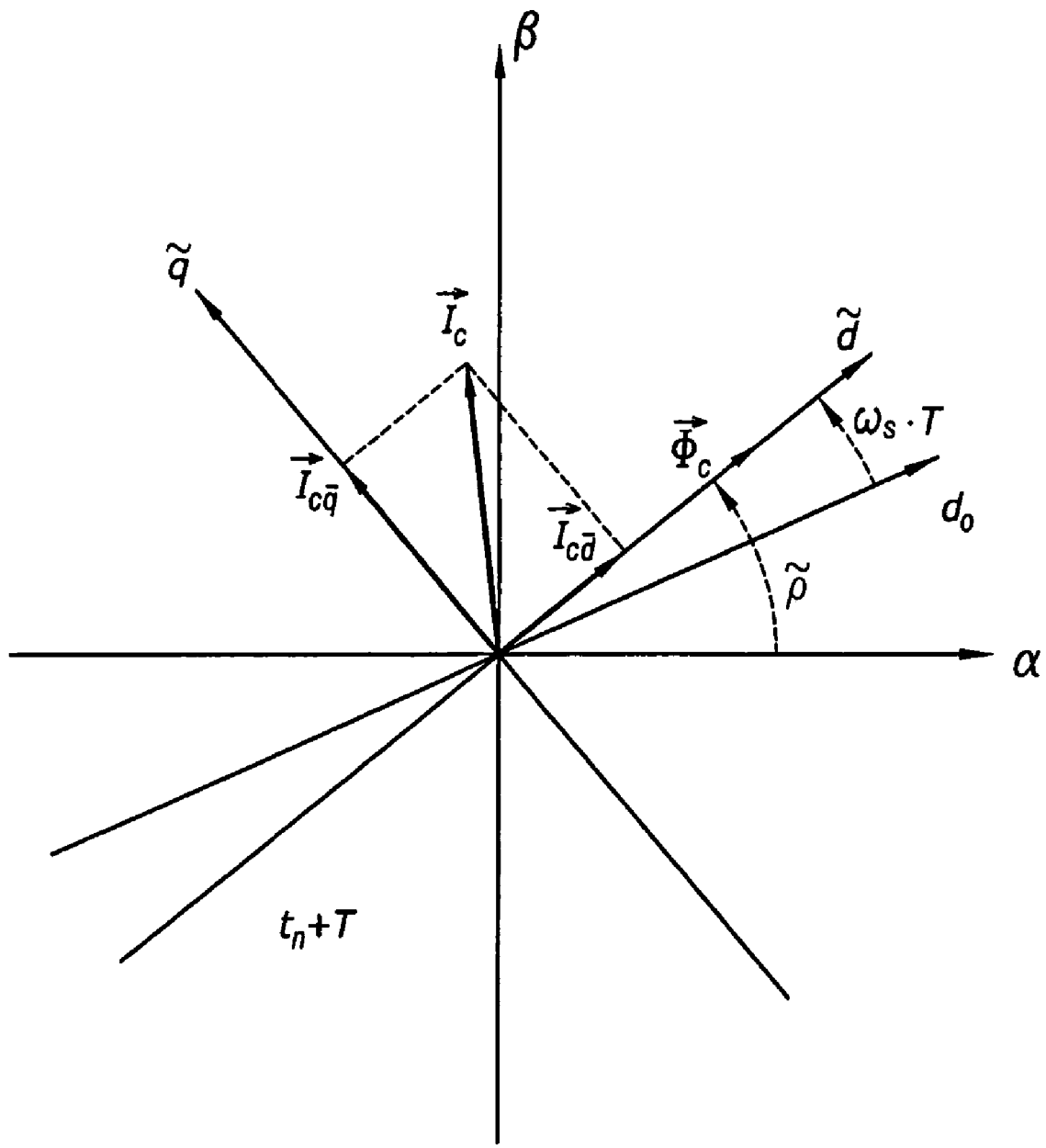

For this calculation, an initial system of axes $(d_0,q_0)$ and a set point system of axes $(\tilde{d},\tilde{q})$ are defined as indicated in FIGS. 2A and 2B, respectively. To be more precise, the system of axes $(d_0,q_0)$ is an orthogonal system of axes whose abscissa axis is aligned with the initial magnetic flux vector $\vec{\Phi}_{r0}$ and the system of axes $(\tilde{d},\tilde{q})$ is an orthogonal system of axes whose abscissa axis is aligned with the set point magnetic flux vector $\vec{\Phi}_c$.

Because the two set point vectors are positioned at the horizon T, i.e. at the end of the interval T, the system of axes $(\tilde{d},\tilde{q})$ is predicted at the end of the interval T, whence the new notation. Its position is an instantaneous position.

The argument $\rho_0$ of the rotor flux vector at the initial time is known, since the flux at that time is known. The argument $\tilde{\rho}$ of the rotor flux vector at the horizon T is unknown. However, the interval T during which the flux vector rotates is known since it is selected in accordance with other considerations. Let us take as the new unknown the instantaneous angular speed $\omega_s$ of the flux vector during this interval. From this we deduce:

$$\tilde{\rho} = \omega_s \cdot T + \rho_0 \tag{108}$$

We multiply the two members of the relationships between the state eigenvectors by:

$$\Gamma_t \cdot \Gamma_c = \Gamma_0 \tag{109}$$

selecting in this case, from the relationship (108):

$$e^{i \cdot \omega_s \cdot T} \cdot e^{-i \cdot \tilde{\rho}} = e^{-i \cdot \rho_0} \tag{110}$$

which is equivalent to an inverse rotation or to a change of the coordinate axes from the system of axes $(\alpha,\beta)$ to the set point system of axes $(\tilde{d},\tilde{q})$ for the set points and to the initial system of axes $(d_0,q_0)$ for the initial state.

$$e^{i \cdot \omega_s \cdot T} \cdot [\vec{\Psi}_{1c} \cdot e^{-i \cdot \tilde{\rho}}] = e^{\mu_1 \cdot T} \cdot [\vec{\Psi}_{10} \cdot e^{-i \cdot \rho_0}] + a_1 \cdot e^{-i \cdot \tilde{\rho}_0} \cdot \vec{V} \tag{111}$$

$$e^{i \cdot \omega_s \cdot T} \cdot [\vec{\Psi}_{2c} \cdot e^{-i \cdot \tilde{\rho}}] = e^{\mu_2 \cdot T} \cdot [\vec{\Psi}_{20} \cdot e^{-i \cdot \rho_0}] + a_2 \cdot e^{-i \cdot \tilde{\rho}_0} \cdot \vec{V} \tag{112}$$

where:

$$\vec{\Psi}_{jc} \cdot e^{-i \cdot \tilde{\rho}} = I_{c\tilde{d}} + i \cdot I_{c\tilde{q}} + \xi_j \cdot \Phi_{c\tilde{d}} \; j \in \{1;2\} \tag{113}$$

$$\Psi_{j0} \cdot e^{-i \cdot \rho_0} = I_{0d_0} + i \cdot I_{0q_0} + \xi_j \cdot \Phi_{0d_0} \tag{114}$$

The set point vector is now easy to calculate as a function of the required torque and as a function of the modulus of the necessary flux, the two primary set points and the original state vector is known.

The following relationship is derived from the relationships (111) to (114) by eliminating the control vector $\vec{V}$:

$$e^{i \omega_s T} \cdot \left[ (I_{c\tilde{d}} + i \cdot I_{c\tilde{q}}) + \Phi_{c\tilde{d}} \cdot \frac{\xi_1 \cdot a_2 - \xi_2 \cdot a_1}{a_2 - a_1} \right] = \tag{115}$$

$$\frac{e^{\mu_1 \cdot T} \cdot [\vec{\Psi}_{10} \cdot e^{-i \cdot \rho_0}] \cdot a_2 - e^{\mu_2 \cdot T} \cdot [\vec{\Psi}_{20} \cdot e^{-i \cdot \rho_0}] \cdot a_1}{a_2 - a_1}$$

The second member is entirely known; we define the modulus and the argument as follows:

$$\eta_0 \cdot e^{i \cdot \zeta} = \frac{e^{\mu_1 \cdot T} \cdot [\vec{\Psi}_{10} \cdot e^{-i \cdot \rho_0}] \cdot a_2 - e^{\mu_2 \cdot T} \cdot [\vec{\Psi}_{20} \cdot e^{-i \cdot \rho_0}] \cdot a_1}{a_2 - a_1} \tag{116}$$

$$= E_0 \cdot e^{i \cdot \varepsilon_0} \cdot e^{-i \cdot \rho_0}$$

$$E_0 \cdot e^{i \cdot \varepsilon_0} = \frac{e^{\mu_1 \cdot T} \cdot [\vec{\Psi}_{10}] \cdot a_2 - e^{\mu_2 \cdot T} \cdot [\vec{\Psi}_{20}] \cdot a_1}{a_2 - a_1} \tag{117}$$

which enables us to simplify the preceding expression:

$$(I_{c\tilde{d}} + i \cdot I_{c\tilde{q}}) + \Phi_{c\tilde{d}} \cdot \frac{\xi_1 \cdot a_2 - \xi_2 \cdot a_1}{a_2 - a_1} = \eta_0 \cdot e^{i(\zeta - \omega_s \cdot T)} \tag{118}$$

This expression is solved by taking the real part and the imaginary part:

$$I_{c\tilde{d}} = -\Phi_{c\tilde{d}} \cdot \mathrm{Re}\left\{ \frac{\xi_1 \cdot a_2 - \xi_2 \cdot a_1}{a_2 - a_1} \right\} + \eta_0 \cdot \cos(\varsigma - \omega_s \cdot T) \tag{119}$$

$$I_{c\tilde{q}} = -\Phi_{c\tilde{d}} \cdot \mathrm{Im}\left\{ \frac{\xi_1 \cdot a_2 - \xi_2 \cdot a_1}{a_2 - a_1} \right\} + \eta_0 \cdot \sin(\varsigma - \omega_s \cdot T) \tag{120}$$

and eliminating $\omega_s$:

$$I_{c\tilde{d}} = -\Phi_{c\tilde{d}} \cdot \mathrm{Re}\left\{ \frac{\xi_1 \cdot a_2 - \xi_2 \cdot a_1}{a_2 - a_1} \right\} + \tag{121}$$

$$\eta_0 \cdot \cos\left( \arcsin\left[ \frac{I_{c\tilde{q}}}{\eta_0} + \frac{\Phi_{c\tilde{d}}}{\eta_0} \cdot \mathrm{Im}\left\{ \frac{\xi_1 \cdot a_2 - \xi_2 \cdot a_1}{a_2 - a_1} \right\} \right] \right)$$

This is the required relationship for transient and steady state conditions for linking the set point transient excitation current to the set point flux and to the set point torque.

Another form of this relationship may be obtained by squaring and summing the real and imaginary parts, which eliminates the angle:

$$\left( I_{c\tilde{d}} + \Phi_{rc} \cdot \mathrm{Re}\left\{ \frac{\xi_1 \cdot a_2 - \xi_2 \cdot a_1}{a_2 - a_1} \right\} \right)^2 + \tag{122}$$

$$\left( I_{c\tilde{q}} + \Phi_{rc} \cdot \mathrm{Im}\left\{ \frac{\xi_1 \cdot a_2 - \xi_2 \cdot a_1}{a_2 - a_1} \right\} \right)^2 - \eta_0^2 = 0$$

this equation being very simple to solve:

$$I_{c\tilde{d}} = -\mathrm{Re}\left\{ \frac{\xi_1 \cdot a_2 - \xi_2 \cdot a_1}{a_2 - a_1} \right\} \cdot \Phi_{rc} - \tag{123}$$

$$\sqrt{\eta_0^2 - \left( I_{c\tilde{q}} + \mathrm{Im}\left\{ \frac{\xi_1 \cdot a_2 - \xi_2 \cdot a_1}{a_2 - a_1} \right\} \cdot \Phi_{rc} \right)^2}$$

We recognize the two forms of the solution, which have been established in a general manner, in this particular situation.

The current set point $I_{cq}$ of an asynchronous motor as a function of the set point torque and the modulus of the set point flux is given by the following relationship:

$$I_{cq} = \frac{C_c}{N_p \cdot \frac{L_m}{L_r} \cdot \|\vec{\Phi}_r\|} \quad \text{with} \quad \|\vec{\Phi}_r\| = \Phi_{rc} \tag{124}$$

It remains only to calculate the two unknowns $\vec{V}$ and $\omega_s$.

II.4—Establishing the Matrix $\Gamma_T$:

The matrix $\Gamma_T$ is given by the relationship:

$$\Gamma_T = e^{i \omega_s \cdot T} \tag{125}$$

$$= \frac{e^{\mu_1 \cdot T} \cdot [\vec{\Psi}_{10} \cdot e^{-i \rho_0}] \cdot a_2 - e^{\mu_2 \cdot T} \cdot [\vec{\Psi}_{20} \cdot e^{-i \rho_0}] \cdot a_1}{[\vec{\Psi}_{1c} \cdot e^{-i \bar{\rho}}] \cdot a_2 - [\vec{\Psi}_{2c} \cdot e^{-i \bar{\rho}}] \cdot a_1}$$

II.5—Calculating the Control Vector:

The control vector is given by the following relationship:

$$\vec{V} = e^{i \rho_0} \cdot \frac{e^{\mu_1 \cdot T} \cdot [\vec{\Psi}_{10} \cdot e^{-i \rho_0}] \cdot [\vec{\Psi}_{2c} \cdot e^{-i \bar{\rho}}] - e^{\mu_2 \cdot T} \cdot [\vec{\Psi}_{20} \cdot e^{-i \rho_0}] \cdot [\vec{\Psi}_{1c} \cdot e^{-i \bar{\rho}}]}{[\vec{\Psi}_{1c} \cdot e^{-i \bar{\rho}}] \cdot a_2 - [\vec{\Psi}_{2c} \cdot e^{-i \bar{\rho}}] \cdot a_1} \tag{126}$$

We recognize the general solution of the control vector corresponding to the motors.

The initial vectors can now be written in the system of axes $(\alpha, \beta)$ in which they are measured, leaving the set point vectors in the set point system of axes in which they are calculated.

$$\vec{V} = \frac{e^{\mu_1 \cdot T} \cdot \vec{\Psi}_{10} \cdot [\vec{\Psi}_{2c} \cdot e^{-i \bar{\rho}}] - e^{\mu_2 \cdot T} \cdot \vec{\Psi}_{20} \cdot [\vec{\Psi}_{1c} \cdot e^{-i \bar{\rho}}]}{[\vec{\Psi}_{1c} \cdot e^{-i \bar{\rho}}] \cdot a_2 - [\vec{\Psi}_{2c} \cdot e^{-i \bar{\rho}}] \cdot a_1} \tag{127}$$

Part III—Concrete Embodiment:

FIG. 3 represents a deadbeat control system 10 of a rotary electrical machine 12 which here is a three-phase asynchronous rotary electric motor with a stator and a rotor.

The system 10 comprises a voltage inverter 14 controlled by pulse width modulation to generate a current and a voltage supplying each phase of the motor 12. To be more precise, under the control of a control unit 18, the inverter 14 converts the DC voltage from a DC voltage supply 16 into a three-phase supply voltage for the motor 12.

The control unit 18 is adapted to receive the set point $\Phi_c$, the rotor magnetic flux, the torque set point $C_c$ and the value of the interval T and is also adapted to receive measurements effected by at most three current sensors 20 to 22 and at most three voltage sensors 24 to 26. Each of the sensors 20 to 22 is adapted to measure the stator current in one phase of the motor 12. Each of the sensors 24 to 26 is adapted to measure the stator voltage in a respective phase of the motor 12.

The unit 18 is also adapted to receive measurements of the angular speed of the rotor of the motor 12 effected by a sensor 28. However, measurement of the mechanical speed of the rotor may be replaced by an estimate thereof, for example an extended KALMAN estimate.

From these measurements, the value of the interval T and the set points $\Phi_c$ and $C_c$ the unit 18 is able to calculate the control vector to be applied to the inverter 14 for the motor 12 to reach both the torque set point $C_c$ and the flux set point $\Phi_c$ at the end of the interval T.

In the case of a voltage inverter, the control vector is a voltage vector whose coordinates are defined in a fixed system of axes of the inverter.

To calculate this control vector, the unit 18 includes in particular a module 30 for establishing the set point current enabling the set points $C_c$ and $\Phi_c$ to be achieved at the end of the interval T and a module 32 for calculating the control vector to be applied continuously during the interval T to obtain at the end of that interval T a current equal to the set point current established by the module 30.

The unit 18 also includes an observer 33 adapted to estimate the rotor flux of the motor 12 from current and/or voltage measurements.

The unit 18 is typically based on a conventional programmable computer adapted to execute instructions stored on an information storage medium 34. To this end, the medium 34 stores instructions for executing the FIG. 4 method when those instructions are executed by the unit 18.

How the system 10 works is described next with reference to the FIG. 4 method.

When the deadbeat control method for the motor 12 is designed, the linear system of continuous state equations of the motor 12 controlled by the inverter 14 is determined from the differential electrical equations of the motor 12 connected to the inverter 14 in a step 40 during which the constants $\sigma$, $\tau_r$, $\alpha$, $\beta$, $\lambda$ and $\gamma$, are calculated and stored, for example on the medium 34.

When the control method is executed, and before continuous application of the calculated control vector during the interval T, the values of the set points $C_c$, $\Phi_c$ and the interval T are selected in a step 42.

The sensor 28 then measures the mechanical angular frequency $\Omega$ of the rotor during a step 44.

The parameters of the motor whose values are a function of the mechanical angular frequency $\Omega$ are then calculated in a step 46. To be more precise, the polar mechanical angular frequency $\omega$, the discriminant $\Delta$ (defined by the relationship 73), the eigenvalues $\mu_1$ and $\mu_2$ (relationships 74 and 75, respectively), the coefficients $\xi_1$ and $\xi_2$ (relationship 93) and the coefficients $a_1$ and $a_2$ (relationship 105, also dependent on T) are calculated during the step 46.

The initial stator current is measured during a step 50 and an initial rotor flux is estimated by the observer 33 during a step 52.

The argument $\rho_0$ is calculated in a step 54 from the estimate of the initial magnetic flux vector $\vec{\Phi}_{r0}$ established during the step 52.

The initial eigenvectors $\vec{\Psi}_{10}$ and $\vec{\Psi}_{20}$ are calculated in a step 56. To be more precise, the coefficients $\vec{\Psi}_{10} \cdot e^{-i \cdot \rho_0}$ and $\vec{\Psi}_{20} \cdot e^{-i \cdot \rho_0}$ are calculated with the aid of the following relationships in the step 56:

$$\vec{\Psi}_{10} \cdot e^{-i \rho_0} = \vec{I}_{s0} \cdot e^{-i \rho_0} + \xi_1 \cdot \|\vec{\Phi}_{r0}\| \quad (128)$$

$$\vec{\Psi}_{20} \cdot e^{-i \rho_0} = \vec{I}_{s0} \cdot e^{-i \rho_0} + \xi_2 \cdot \|\vec{\Phi}_{r0}\| \quad (129)$$

The current set point is established during a step 60 executed in parallel with the steps 50 to 56, with the aid of the relationships (123) and (124).

The eigenvectors $\vec{\Psi}_{1c}$ and $\vec{\Psi}_{2c}$ are established in a step 62. To be more precise, the factors $\vec{\Psi}_{1c} \cdot e^{i \hat{\rho}}$ and $\vec{\Psi}_{2c} \cdot e^{-i \hat{\rho}}$ are calculated in the step 62 with the aid of the following relationships:

$$\vec{\Psi}_{1c} \cdot e^{-i \hat{\rho}} = I_{dc} + i \cdot I_{qc} + \xi_1 \cdot \|\vec{\Phi}_{rc}\| \quad (130)$$

$$\vec{\Psi}_{2c} \cdot e^{-i \hat{\rho}} = I_{dc} + i \cdot I_{qc} + \xi_2 \cdot \|\vec{\Phi}_{rc}\| \quad (140)$$

Once the set point and initial eigenvectors have been established in a step 64, the control vector is calculated with the aid of the relationship 127.

The inverter 14 applies this calculated average control vector continuously in the interval T, by pulse width modulation, in a step 66.

The steps 42 to 66 are then repeated for a new interval T.

Many other embodiments of this control system and method are feasible. For example, the initial magnetic flux vector can be measured rather than estimated by means of an observer.

The method and the system are described here in the particular situation in which the exact analytical solution yielding both the current set point vector and the control vector is implemented. Alternatively, terms of these exact analytic solutions that are negligible can be omitted, as a function of the specific application envisaged. For example, the square root of the relation (123) may be treated as $|\eta_0|$ if T is small compared to the electrical time constants of the motor.

The system 10 has been described in the particular situation where the motor is controlled by an inverter. However, the description applies equally to motors controlled by switch mode controllers, amplifiers or rectifiers capable of producing the calculated control voltage.

Finally, as indicated in the introduction, if the system of state equations describing the operation of the motor is not linear, it is possible to linearize it around a plurality of operating points and to apply the method and the system described above to each linearized system.

What is claimed is:

1. A deadbeat control method of controlling an asynchronous rotary electrical machine whose magnetic flux depends on its energization current, the method applying an average control vector continuously or applying an average value thereof over a time interval T to obtain a mechanical force generated by the machine equal to a predetermined mechanical force set point at the end of the interval T, which method comprises:

a) a step of establishing a set point current that is adapted to achieve at the end of the interval T both the mechanical force set point and a set point magnetic flux and is established on the basis of a relationship between the set point current, the set point magnetic flux and initial current and magnetic flux values at the beginning of the interval T; and b) a step of calculating the average control vector to be applied continuously during the interval T to obtain at the end of the interval T a current equal to the set point current established during the step a).

2. A method according to claim 1, wherein the set point current is a solution of the following complex relationship:

$$(a_2 \cdot p_{11} - a_1 \cdot p_{21}) \cdot \vec{I}_c + (a_2 \cdot p_{12} - a_1 \cdot p_{22}) \cdot \vec{\Phi}_c = (a_2 \cdot e_1 \cdot p_{11} - a_1 \cdot e_2 \cdot p_{21}) \cdot \vec{I}_0 + (a_2 \cdot e_1 \cdot p_{12} - a_1 \cdot e_2 \cdot p_{22}) \cdot \vec{\Phi}_0$$

in which:

$P_{ij}$ are the coefficients of the inverse of a matrix P of eigenvalues defined by the following relationship $A = P \cdot D \cdot P^{-1}$, where D is the diagonal matrix of the eigenvalues $\mu_i$ of the matrix A, $P^{-1}$ is the inverse of the matrix P, and the matrix A is the matrix of free behavior of the machine in a linear system of state equations modeling the operation of the machine;

the coefficients $a_i$ are the coefficients of a matrix C defined by the following relationship $C = D^{-1} \cdot (e^{D \cdot T} - I) \cdot (P^{-1} \cdot B)$, in which the matrix I is the unit matrix and the matrix B is the control matrix of the machine in the linear system of state equations;

the vectors $\vec{\Phi}_0$ and $\vec{I}_0$ respectively represent the initial state of the current and of the magnetic flux of the machine at the beginning of the interval T;

the vectors $\vec{I}_c$ and $\vec{\Phi}_c$ are respectively the set point current vector and the set point magnetic flux vector; and the coefficients $e_i$ are defined by the following relationship $e_i = e^{\mu_i \cdot T}$.

3. A method according to claim 2 for an asynchronous rotary electrical machine having a stator and a rotor, wherein the state vector of the linear system of state equations modeling the operation of the machine is formed of a stator current vector and a rotor magnetic flux vector.

4. A method according to claim 1, wherein the average control vector is the exact solution of the following discrete system of state equations of the machine:

$$\vec{X}_c = F(T) \cdot \vec{X}_0 + G(T) \cdot \vec{V}$$

in which:

the vector $\vec{X}_0$ is a state vector defining the initial states of the current and the magnetic flux of the machine at the beginning of the interval T;

the vector $\vec{X}_c$ is a set point state vector defining the set point current and the set point magnetic flux of the machine;

the vector $\vec{V}$ is the average control vector of the machine;

the matrix F(T) is a transition matrix of the machine defined by the relationship $F = e^{A \cdot T}$, where A is the matrix of free behavior of the machine in a linear system of state equations modeling the operation of the machine; and the matrix G(T) is a control matrix of the machine whose value is a function of the value of the interval T.

5. A method according to claim 1, wherein the average control vector is the result of the following relationship:

$$\vec{V} = e^{i \cdot \theta_0} \cdot \frac{e^{\mu_1 \cdot T}[p_{11}(I_{0d_0} + i \cdot I_{0q_0}) + p_{12} \cdot \Phi_{0d_0}] \cdot [p_{21} \cdot (I_{cd} + i \cdot I_{cq}) + p_{22} \cdot \Phi_{cd}] - e^{\mu_2 \cdot T} \cdot [p_{21} \cdot (I_{0d_0} + i \cdot I_{0q_0}) + p_{22} \cdot \Phi_{0d_0}] \cdot [p_{11} \cdot (I_{cd} + i \cdot I_{cq}) + p_{12} \cdot \Phi_{cd}]}{a_2 \cdot [p_{11} \cdot (I_{cd} + i \cdot I_{cq}) + p_{12} \cdot \Phi_{cd}] - a_1 \cdot [p_{21} \cdot (I_{cd} + i \cdot I_{cq}) + p_{22} \cdot \Phi_{cd}]}$$

in which:

$\theta_0$ is the angular position of an initial system of axes whose abscissa axis is aligned with an initial magnetic flux vector of the machine at the beginning of the interval T;

the coefficients $p_{ij}$ are the coefficients of the inverse of a matrix P of eigenvectors defined by the relation $A=P \cdot D \cdot P^{-1}$, where D is the diagonal matrix of the eigenvalues $\mu_i$ of the matrix A, $P^{-1}$ is the inverse of the matrix P, and the matrix A is the matrix of free behavior of the machine in a linear system of state equations modeling the operation of the machine;

$I_{0d_0}$, $I_{0d_0}$ are the coordinates of the initial current vector at the beginning of the interval T in an initial system of axes whose abscissa axis is aligned with the direction of the initial magnetic flux vector;

$\Phi_{0d_0}$ is the abscissa of the initial magnetic flux vector in the initial system of axes;

$I_{cd}$, $I_{cq}$ are the coordinates of the set point current vector at the end of the interval T in a set point system of axes whose abscissa axis is aligned with the direction of the set point magnetic flux vector; and $\Phi_{cd}$ is the abscissa of the set point magnetic flux vector in the set point system of axes.

6. A method according to claim 1, wherein the set point current has coordinates $I_{cd}$ and $I_{cq}$ at the end of interval T, in a set point system of axes whose abscissa axis is aligned with the direction of the set point magnetic flux vector, and wherein coordinate $I_{cd}$ is established from coordinate $I_{cq}$ and the set point magnetic flux.

7. An information storage medium containing instructions for executing a method according to claim 1 when said instructions are executed by an electronic computer.

8. A deadbeat control unit for controlling an asynchronous rotary electrical machine the magnetic flux whereof is controlled on the basis of its energization current, wherein said unit includes:

a module for establishing a set point current that is adapted to achieve at the end of the interval T both the mechanical force set point and a set point magnetic flux and is established on the basis of a relationship between the set point current, the set point magnetic flux and initial current and magnetic flux values at the beginning of the interval T; and a module for calculating the average control vector to be applied continuously during the interval T to obtain at the end of the interval T a current equal to the set point current established by the module.

* * * * *